United States Patent
Arai

(10) Patent No.: US 7,995,223 B2
(45) Date of Patent: Aug. 9, 2011

(54) PRINTING APPARATUS

(75) Inventor: Mutsumi Arai, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 585 days.

(21) Appl. No.: 12/219,485

(22) Filed: Jul. 23, 2008

(65) Prior Publication Data

US 2009/0027723 A1 Jan. 29, 2009

(30) Foreign Application Priority Data

Jul. 25, 2007 (JP) ................................ 2007-193406

(51) Int. Cl.
G06F 3/12 (2006.01)
(52) U.S. Cl. ..................... 358/1.13; 358/1.15; 715/236
(58) Field of Classification Search .................. 358/1.13, 358/1.15; 715/236, 239
See application file for complete search history.

(56) References Cited

U.S. PATENT DOCUMENTS

| | | | | |
|---|---|---|---|---|
| 2008/0254426 | A1* | 10/2008 | Cohen | 434/308 |
| 2009/0119303 | A1* | 5/2009 | Rio et al. | 707/10 |
| 2009/0137206 | A1* | 5/2009 | Sherman et al. | 455/41.2 |

FOREIGN PATENT DOCUMENTS

| | | |
|---|---|---|
| JP | 2002-140177 A | 5/2002 |
| JP | 2003-280839 | 10/2003 |

* cited by examiner

*Primary Examiner* — Jerome Grant, II
(74) *Attorney, Agent, or Firm* — Rabin & Berdo, P.C.

(57) ABSTRACT

A printing apparatus is supplied, capable of continuing print process by switching to other PDL automatically when error occurs in PDL process execution. In the printing apparatus, an interpreting and making section interprets print data on the basis of language format and makes output use data; a detecting section detects an occurrence of error in the interpreting and making section; a priority order information storing section previously stores priority order information representing a priority order to correspond to each language format information; a reading and selecting section reads out the corresponding priority order information on the basis of the language format information, and selects a change language format on the basis of the priority order information; a changing section changes the print data and the language format information into change print data and change language format information; and a controlling section controls the interpreting and making section to execute an interpretation of the change print data and a making of output use data based on the change language format.

9 Claims, 14 Drawing Sheets

| SWITCH SOURCE PDL NAME \ ERROR NAME | MEMORY FULL | RESOURCE SHORTAGE | OTHER |
|---|---|---|---|
| PDL1 | 1　PDL2<br>2　PDL3 | 1　PDL3<br>2　PDL2 | 1　PDL3<br>2　PDL2 |
| PDL2 | 1　PDL3<br>2　PDL1 | 1　PDL1<br>2　PDL3 | 1　PDL1<br>2　PDL3 |
| PDL3 | 1　PDL2<br>2　PDL1 | 1　PDL1<br>2　PDL2 | 1　PDL1<br>2　PDL2 |

*FIG. 3*

| PDL NAME | EXECUTION END INFORMATION |
|---|---|
| PDL1 | END |
| PDL2 | |
| PDL3 | |

*FIG. 4*

IN PRINTING

*FIG. 5A*

IN PRINTING
PRINT DATA OF PDL1 IS
BEING PRINTED IN PDL2

*FIG. 5B*

ERROR: MEMORY FULL
PRINT DATA OF PDL1 WAS RESPECTIVELY
PROCESSED BY PDL2 AND PDL3, BUT
A PRINT CANNOT BE PERFORMED.

*FIG. 5C*

| SWITCH SOURCE PDL NAME | PDL SELECTION LIST |
|---|---|
| PDL1 | 1　PDL2<br>2　PDL3 |
| PDL2 | 1　PDL3<br>2 INEXISTENCE |
| PDL3 | 1 INEXISTENCE<br>2 INEXISTENCE |

| SWITCH SOURCE PDL NAME | PDL SELECTION LIST |
|---|---|
| PDL1 | 1 INEXISTENCE<br>2 INEXISTENCE |
| PDL2 | 1 INEXISTENCE<br>2 INEXISTENCE |
| PDL3 | 1 INEXISTENCE<br>2 INEXISTENCE |

ERROR
PRINT DATA OF PDL2 WAS
PROCESSED BY PDL3, BUT A PRINT
CANNOT BE PERFORMED.

*FIG. 11*

PRINTING APPARATUS

BACKGROUND OF THE INVENTION

1. Field of the Invention

The invention relates to a printing apparatus, which receives print data described by printer language and performs a print, specially relates to a printing apparatus in which plural printer languages are installed.

2. Related Background Art

In a print processing system that is composed of a higher rank apparatus such as personal computer and the like, and a printing apparatus such as printer and the like that is connected to the higher rank apparatus, when a print is instructed in an application operating in the higher rank apparatus, a printer driver installed in the higher rank apparatus changes the print manuscript data made by the application into printer language (Page Description Language; hereinafter: PDL) as language format which can be interpreted by printer. The print manuscript data that has been changed, namely PDL data is sent from the higher rank apparatus to the printing apparatus. The printing apparatus interprets the received PDL data and expands the PDL data into dot image, then performs print per page.

In recent years, many printing apparatuses installed plural PDLS for trying to improve print process ability and quality of image. In the print processing system corresponding to such plural PDL, before a change process to change print manuscript data into PDL data, one of PDLS is selected and set in printer driver. Then, the higher rank apparatus performs the change process of the print manuscript data on the basis of PDL which has been set, and sends a print job which is composed of PDL data and PDL recognition data representing the PDL data to the printing apparatus. The printing apparatus implements PDL process interpreting and expanding PDL data on the basis of PDL corresponding to PDL recognition data when received the print job from the higher rank apparatus.

In the execution of the PDL process, for example, when an error of memory shortage occurred, the printing apparatus displays an error scene notifying memory shortage in an operator panel and stops the print process. For that reason, in order to complete the print process that was stopped, an operator processes the higher rank apparatus and has to perform work such as change of content in application or change of setting in the printer driver for avoiding the occurrence of error after the operator goes to setting place and confirms content of error displayed in the error scene, therefore, it is necessary to spend time.

In order to solve the problem above stated, a kind of technique of the printer driver and print controlling apparatus that can restart the print process by automatically switching PDL is published in following patent document 1. When an error occurred in execution of the PDL process, the occurrence of error is notified of printer driver. Moreover, after a setting is updated into other PDL by the printer driver, the change process from the print manuscript data to the PDL data is performed and the print job including the PDL data is sent to the printing apparatus.

Patent document 1: Japan patent publication 2003-280839.

However, in the published technique, the particular printer driver has to be installed in the higher rank apparatus; further, the change process from the print manuscript data to the PDL data and a sending process of the print job have to be executed again in the higher rank apparatus when error occurs, so it is inconvenient because the higher rank apparatus bears heavy burden.

Therefore, it is desired to supply a printing apparatus that can automatically switch other PDL to continue the print process, without heavy burden to user and the higher rank apparatus, when error occurs in the PDL process execution.

SUMMARY OF THE INVENTION

It is, therefore, an object of the invention to provide a printing apparatus capable of solving the above problem.

According to the present invention, there is provided a printing apparatus which receives print data described by one of plural language formats, interprets and outputs the print data, comprising:

a receiving section that receives the print data and language format information representing language format of the print data;

an interpreting and making section that interprets the print data on the basis of the language format and makes output use data;

a detecting section that detects an occurrence of error in the interpreting and making section;

a priority order information storing section that previously stores priority order information representing an priority order to correspond to the language format information of each language format as other language format;

a reading and selecting section that reads out the corresponding priority order information from the priority order information storing section on the basis of the language format information of the print data, and selects one of the language formats as a change language format on the basis of the priority order information;

a changing section that changes the received print data into change print data described by the selected change language format, and changes the language format information of the print data into change language format information, when the detecting section detected the occurrence of error; and a controlling section that controls the interpreting and making section to execute an interpretation of the change print data and a making of the output use data based on the change language format.

Moreover, the printing apparatus may further comprise an error judging section that judges kind of the error detected by the detecting section, wherein the priority order information storing section stores priority order information to further correspond to the kind of each error; an reading and selecting section further performs to read out priority order information on the basis of the kind of error judged by the error judging section and selects change language format.

Moreover, the printing apparatus may further comprise a storing section that stores execution information that corresponds to each language format information, and represents whether or not a process executed by the interpreting and making section on the basis of the language format is ended; an execution judging section that, when the change language format is selected by the reading and selecting section, refers to the storing section to judge whether or not the process based on the change language format is ended, according to the stored execution information corresponding to language format information of the change language format, wherein when judged that the process is ended, the reading and selecting section that further performs a selection of the change language format on the basis of the priority order information.

Moreover, the printing apparatus may further comprise a displaying section that displays for notifying of the change language format when the process based on the change language format is executed by the interpreting and making section.

Moreover, the printing apparatus may further comprise a sending section that sends the corresponding language format information to a higher rank apparatus for notifying the change language format when the process based on the change language format is executed by the interpreting and making section.

Moreover, the printing apparatus may further comprise an inputting section that inputs respective priority order information to correspond to each language format information and; a setting section that sets the inputted priority order information into the priority order information storing section.

Moreover, the printing apparatus may further comprise a counting section that counts process execution time number of the interpreting and making section; and a continuation judging section that judges whether or not to continue print process on the basis of the counted process execution time number when the occurrence of error is detected by the detecting section, wherein when judged to continue, the reading and selecting section performs a selection of the change language format.

Moreover, the printing apparatus may further comprise a stopping section that stops the print process, when the continuation judging section judged not to continue; and a notifying section that notifies of a stoppage of the print process.

Moreover, in the printing apparatus, the language format may be composed of PDL (Page Description Language).

Effect of the Present Invention

According to the present invention, on the bases of the language format set by the higher rank apparatus, when error occurred in executing the print process of the print data received from the higher rank apparatus, because it is possible to automatically switch to other language format for changing the print data, even if user does not perform particular operation, it is possible to continue the print process through eliminating error, so that convenience is improved. Moreover, it is possible to make the existing higher rank apparatus be used as it was, so that cost is reduced.

The above and other objects and features of the present invention will become apparent from the following detailed description and the appended claims with reference to the accompanying drawings.

BRIEF DESCRIPTION OF THE DRAWINGS

FIG. 3 is an explanation diagram for representing a structure of list storing section in embodiment 1;

FIG. 4 is an explanation diagram for representing a structure of storing section;

FIG. 5A is an explanation diagram (I) of notification scene that is displayed on an operator panel of embodiment 1;

FIG. 5B is an explanation diagram (II) of notification scene that is displayed on an operator panel of embodiment 1;

FIG. 5C is an explanation diagram (III) of notification scene that is displayed on an operator panel of embodiment 1;

FIG. 10A is a first explanation diagram for representing a structure of list storing section in embodiment 2;

FIG. 10B is a second explanation diagram for representing a structure of list storing section in of embodiment 2;

FIG. 11 is an explanation diagram of notification scene that is displayed on an operator panel of embodiment 2;

DETAILED DESCRIPTION OF THE PREFERRED EMBODIMENTS

Embodiments of the invention will be described in detail hereinbelow with reference to the drawings.

Embodiment 1

Structure of Embodiment 1

Figure 1:
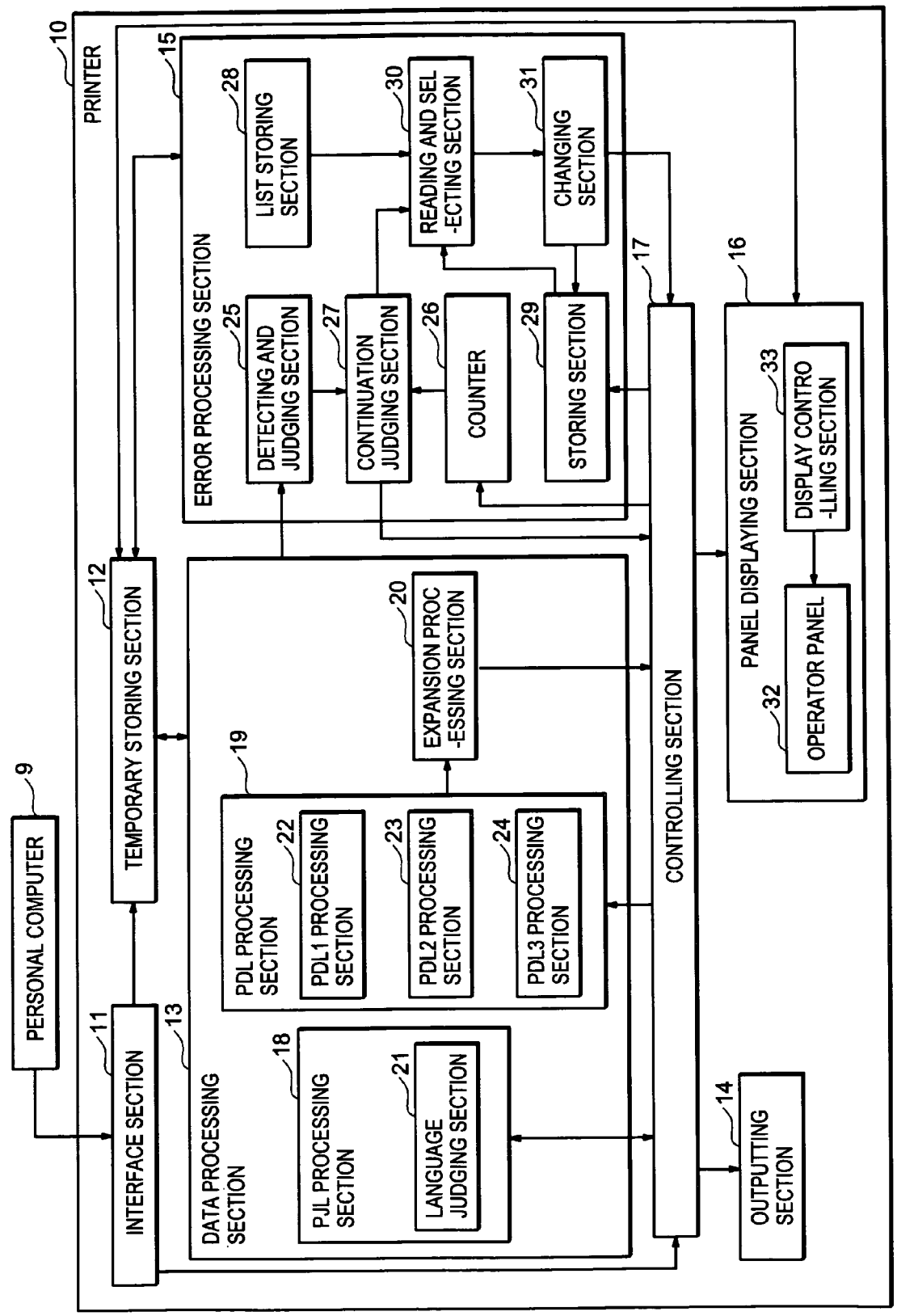
FIG. 1 is a block diagram for representing a structure of a printing apparatus in embodiment 1 of the present invention.

FIG. 1 is a block diagram for representing a structure of a printing apparatus in embodiment 1 of the present invention.

A printer 10 of the embodiment 1 is connected to a personal computer 9 serving as a higher rank apparatus; receives print job from the personal computer 9; and performs a print process.

The personal computer 9, as a higher rank apparatus of printer 10, has a function to generate a print job and send the print job to the printer 10, and changes print manuscript data made by an application into PDL data described by a printer language (Page Description Language; hereinafter: PDL) serving as language format that can be interpreted by the printer 10, on the basis of a print instruction which is inputted in the application. Then, the personal computer 9 generates a print job including the PDL data and sends it to the printer 10.

In the print job generated by the personal computer 9, beside the PDL data, PJL data is included, which is described by printer job control language (Printer Job Language; hereinafter: PJL) that can be interpreted by the printer 10. The PJL data, as language format information, is formed from PDL recognition data representing the kind of PDL describing the PDL data included in the print job, that is, representing the kind of description PDL.

In the present embodiment, the printer 10 is a printing apparatus in which plural PDLs are installed, as shown by FIG. 1, comprises an interface section 11, a temporary storing section 12, a data processing section 13, an outputting section 14, an error processing section 15, a panel displaying section 16 and a controlling section 17. Moreover, in the printer 10 of the present embodiment, three kinds of PDLs, that is, PDL 1, PDL 2 and PDL 3 are installed.

The interface section 11, as a receiving section, has a function to receive the print job from the personal computer 9. The print job, as above stated, includes the PJL data and the PDL data. The interface section 11 sends the PJL data and the PDL data that have been received, to the temporary storing section 12 and makes it store. Moreover, the interface section 11 notifies the controlling section 17 of receiving the print job.

The temporary storing section 12 has a function to temporarily store various data, and as a receiving buffer, correspondingly stores the PJL data and the PDL data included in the print job received by the interface section 11, moreover, the temporary storing section 12 makes a description PDL name (mentioned below) correspond to the PDL data above stated, and stores them. Furthermore, the temporary storing section 12 correspondingly stores change PDL name and change PDL data that are mentioned below.

The data processing section 13, as shown by FIG. 1, includes a PJL processing section 18, a PDL processing section 19, an expansion processing section 20.

The PJL processing section 18 is a processing section that performs an analysis process of the PJL data described by the PJL on the basis of instruction from the controlling section 17, and has a Language judging section 21.

The language judging section 21 reads out the PJL data from the temporary storing section 12, and judges the description PDL corresponding to the PDL data is which of PDL 1, PDL 2 and PDL 3 on the basis of the PJL data. Further, the language judging section 21 sends the description PDL name that serves as recognition data for recognizing the judged description PDL to the temporary storing section 12, and notifies the controlling section 17 of the description PDL name together with making the description PDL name be stored to correspond to the PDL data. Moreover, in the embodiment, the PDL names corresponding to respective PDLs, namely, PDL 1, PDL 2 and PDL 3 are set into "PDL 1", "PDL 2" and "PDL 3".

The PDL processing section 19, as shown by FIG. 1, includes a PDL1 processing section 22, a PDL2 processing section 23 and a PDL3 processing section 24. The PDL processing section 19, as an interpreting and making section, receives a notification of the description PDL name from the controlling section 17 and reads out the PDL data that is being stored corresponding to the description PDL name from the temporary storing section 12. Then, the PDL processing section 19 performs an analysis process of the PDL data on the basis of the description PDL and changes the PDL data into middle code. Further, when a change PDL name is notified from the controlling section 17, the PDL processing section 19 reads out change PDL data that is being stored corresponding to the change PDL name from the temporary storing section 12 and performs an analysis process of the change PDL data and a change process to the middle code on the basis of the change PDL. The PDL data or the middle code changed from the change PDL data is stored in a page buffer not shown. Furthermore, the PDL processing section 19 notifies the expansion processing section 20 of a completion of PDL process that is composed of the analysis process and the change process.

Figure 2A:
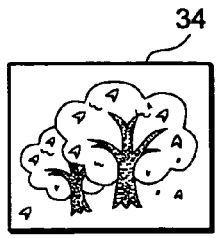
FIG. 2A is a first explanation diagram for explaining a PDL process in PDL processing section.
Figure 2B:
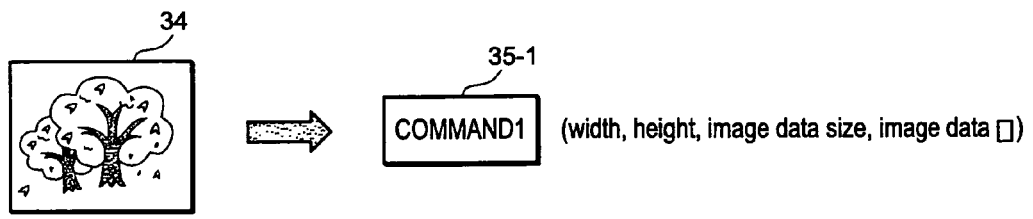
FIG. 2B is a second explanation diagram for explaining a PDL process in PDL processing section.
Figure 2C:
FIG. 2C is a third explanation diagram for explaining a PDL process in PDL processing section.
Figure 2D:
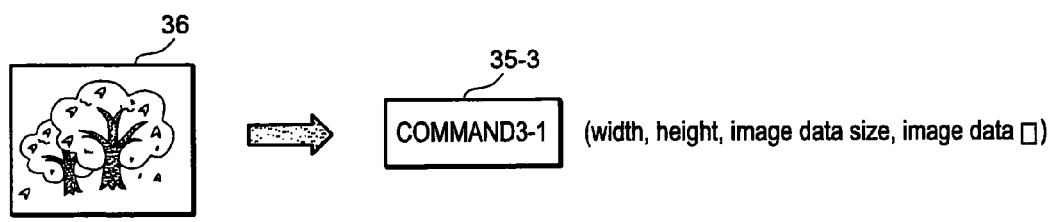
FIG. 2D is a fourth explanation diagram for explaining a PDL process in PDL processing section.
Figure 2E:
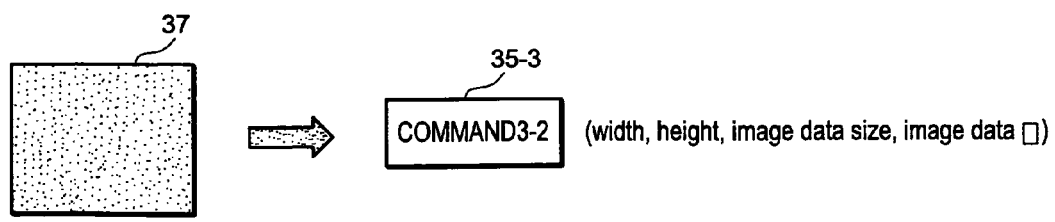
FIG. 2E is a fifth explanation diagram for explaining a PDL process in PDL processing section.

FIG. 2A is a first explanation diagram for explaining a PDL process in PDL processing section; FIG. 2B is a second explanation diagram for explaining a PDL process in PDL processing section; FIG. 2C is a third explanation diagram for explaining a PDL process in PDL processing section; FIG. 2D is a fourth explanation diagram for explaining a PDL process in PDL processing section; and FIG. 2E is a fifth explanation diagram for explaining a PDL process in PDL processing section.

FIG. 2A is a diagram representing the PDL data made by the personal computer 9 as print image 34. FIG. 2B is a diagram for explaining the PDL process implemented by the PDL1 processing section 22 with respect to the PDL data corresponding to the print image 34. Moreover, FIG. 2C is a diagram for explaining the PDL process in the PDL2 processing section 23. FIG. 2D and FIG. 2E are diagrams for explaining the PDL process in the PDL3 processing section 24.

The PDL1 processing section 22 interprets the PDL data on the basis of the PDL 1 and changes it into middle code. In the present embodiment, the PDL 1 is a PDL that is composed of a command system performing process with object unit. The PDL1 processing section 22 interprets the PDL data on the basis of the PDL 1, as shown by the FIG. 2B, changes it into middle data that is composed of a command of "command 1".

The PDL2 processing section 23 interprets the PDL data on the basis of the PDL 2 and changes it into the middle code. In the present embodiment, the PDL 2 is a PDL that is composed of a command system to process by dividing the PDL data with raster unit. The PDL2 processing section 23, as shown by the FIG. 2C, divides the PDL data corresponding to the print image 34 with raster unit and changes these divided each data into respective commands and gets the middle data that is composed of the plural commands. In the FIG. 2C, the PDL data is divided into five parts by the PDL2 processing section 23, and is changed into the middle data 35-2 including five commands of "Command2-1", "Command2-2" . . . "Command2-5".

The PDL3 processing section 24 interprets the PDL data on the basis of the PDL 3 and changes it into the middle code. In the present embodiment, the PDL 3 is a PDL that is composed of command system performing process by dividing the PDL data into painting pattern and penetration pattern. The PDL3 processing section 24 firstly divides the print image 34 corresponding to the PDL data into the painting pattern 36 represented in the FIG. 2D and the penetration pattern 37 represented in the FIG. 2E. Then, the PDL3 processing section 24 changes the PDL data corresponding to the painting pattern 36 to the command "command3-1", and changes the PDL data corresponding to the penetration pattern 37 to the command "command3-2", and gets the middle data 35-3 that is composed of the two commands.

The expansion processing section 20, as an interpreting and making section, performs an expanding process that reads out the middle code from page buffer and changes it into dot image as output use data, when the completion of the PDL process is notified from the PDL processing section 19. The dot image changed from the middle code is stored in a raster buffer that is not shown. Further, the expansion processing section 20 notifies the controlling section 17 of the completion of the expanding process.

The outputting section 14 reads out the dot image from the raster buffer on the basis of the instruction from the controlling section 17 and performs an output on the basis of the dot image.

The error processing section 15 is a processing section for detecting on occurrence of error in the data processing section 13 and performing switch and change to the other PDL. As shown by FIG. 1, the error processing section 15 includes a detecting and judging section 25, a counter 26, a continuation judging section 27, a list storing section 28, a storing section 29, a reading and selecting section 30 and a changing section 31.

The detecting and judging section 25, as a detecting section and an error judging section, has a detecting function to detect the occurrence of error and a judging function to judge the kind of the occurred error in the data processing section 13.

The detecting and judging section 25 monitors operation situation of the data processing section 13 and detects the occurrence of error. Further, the detecting and judging section 25 judges the kind of the occurred error is which of memory full error and resource shortage error. Here, the memory full error is an error caused by memory shortage in the PDL process execution of the PDL processing section 19; the resource shortage error means an error caused by shortage of resource such as font and color profile. Moreover, when judged that neither memory full error nor resource shortage error exists, the detecting and judging section 25 judges that the kind of the error is other error. The detecting and judging section 25, respectively assigns error name of "memory full", "resource shortage" and "other" to various errors, namely the memory full error, the resource shortage error and other error, as recognition data for respectively recognizing errors. Moreover, the detecting and judging section 25 judges the PDL name of the PDL that is being processed and executed in the data processing section 13. Further, the detecting and judging section 25 notifies the continuation judging section 27 of the detection of error, the judged error name and the judged PDL name.

The counter 26, on the basis of the control of the controlling section 17, with respect to each print job, counts an execution time number of the PDL process executed in the PDL processing section 19 as process execution time number i.

The continuation judging section 27 judges whether or not to continue the print process when the detection of error, the error name and the PDL name are notified from the detecting and judging section 25. The continuation judging section 27 reads out the process execution time number from the counter 26, and compares the process execution time number i that has been read out with the number of the PDL that is being installed in the printer 10, namely installation PDL number N. When the process execution time number i is under the installation PDL number N, the continuation judging section 27 judges to continue the print process and regards the PDL name notified from the detecting and judging section 25 as the switch source PDL name, then notifies the reading and selecting section 30 of the switch source PDL name and the error name notified from the detecting and judging section 25. Moreover, when the process execution time number i is equal to the installation PDL number N, the continuation judging section 27 judges to stop the print process, and notifies the controlling section 17 of the judgment result and the error name. Moreover, the installation PDL number N of the printer 10 is "3" in embodiment 1.

The list storing section 28, as a priority order information storing section, is a storing section that stores PDL selection list as priority order information.

FIG. 3 is an explanation diagram for representing a structure of list storing section in embodiment 1.

In the list storing section 28 of the present embodiment, as shown by FIG. 3, the PDL selection lists 38-1~9 are being stored corresponding to each of switch source PDL names of "PDL 1", "PDL2" and "PDL3", and each of error names of "memory full", "resource shortage" and "other".

When error occurred in executing the PDL process in the PDL processing section 19, the PDL selection lists 38-1~9 being stored in the list storing section 28, are lists used for selecting the PDL of switch destination; each list is formed by (N−1) priority PDLs. In the case, the PDL corresponding to priority order "1" is regarded as first priority PDL, and the PDL corresponding to priority order 2 is regarded as second priority PDL, until (N−1)th priority PDL. Here, N is the installation PDL number, in the present embodiment it is "3".

For example, when the memory full error occurred in executing the PDL process based on the PDL1 in the PDL processing section 22, the PDL selection list 38-1 being stored corresponding to the switch source PDL name "PDL1" and the error name "memory full", is a list that is read out by the reading and selecting section 30 and is used and represents a priority order of other PDLs, that is, it is represented which of PDL2 and PDL3 is priority selected. In the list storing section 28 as shown by FIG. 3, the PDL selection list 38-1, has a first priority PDL name "PDL 2" representing first priority PDL corresponding to priority order "1", and a second priority PDL name "PDL 3" representing second priority PDL corresponding to priority order "2".

Each of the PDL selection lists 38-1~9 stored in the list storing section 28 is previously set on the basis of characteristic of the command system of each PDL.

For example, on the one hand, because the process is executed according to object unit (FIG. 2B, FIG. 2D and FIG. 2E), when the PDL process is executed, it is necessary for the PDL1 processing section 22 and the PDL3 processing section 24 to get memory field having dimension of the object. On the other hand, because the process is executed according to raster unit (FIG. 2C), if a memory field having dimension of the raster exists, it is possible for the PDL2 processing section 23 to execute the PDL process. Therefore, even if the memory error occurs in the PDL1 and the PDL3, it is possible for the PDL2 to avoid the memory full error.

Further, the PDL3 processing section 24 divides the PDL data into the painting pattern and penetration pattern, and performs the process (FIG. 2D and FIG. 2E). For that reason, by comparing with the process content of the PDL1 processing section 22, an occasion is possible that contents such as color matching process and decode process become simple, and memory field being used becomes small. Therefore, even if the memory error occurs in the PDL1, it is possible for the PDL3 to avoid the memory full error.

From the characteristic above stated, in the list storing section 28 shown by FIG. 3, for example, in the PDL selection list 38-1 corresponding to the switch source PDL name "PDL1" and the error name "memory full", "PDL2" serving as first priority PDL name, "PDL3" serving as second priority PDL name are set. Further, in the PDL selection list 38-2 corresponding to the switch source PDL name "PDL2" and the error name "memory full", "PDL3" as first priority PDL name, "PDL1" as second priority PDL name are set.

Thus, through considering the characteristic of the command system of the switch source PDL, respective PDL selection lists 38-1~9 are previously set in the list storing section 28, then are stored.

In the storing section 29, corresponding to each switch source PDL name, execution end information is stored, that represents that the PDL process in the PDL processing section 19 is executed and ended.

FIG. 4 is an explanation diagram for representing a structure of storing section.

In the storing section 29, as shown by FIG. 4, corresponding to each of PDL name "PDL1", "PDL2" and "PDL3", the execution end information item for storing the execution end information "end" serving as execution information is set.

For example, in FIG. 4, in the storing section 29, the execution end information "end" is stored in the execution end information item corresponding to PDL name "PDL1". It represents that the PDL process based on the PDL1 in the PDL processing section 19 is executed and is ended with respect to the print job in print process execution in the printer 10.

When the switch source PDL name and the error name are notified from the continuation judging section 27, the reading and selecting section 30 reads out the corresponding PDL selection list from the list storing section 28 on the basis of the switch source PDL name and the error name. Further, the reading and selecting section 30 selects the change PDL serving as the PDL of switch destination by referring to the storing section 29.

For example, when the switch source PDL name is "PDL1", and the error name is "memory full" that are notified from the continuation judging section 27, the reading and selecting section 30 reads out the PDL selection list 38-1 corresponding to the switch source PDL name "PDL1" and the error name "memory full" from the list storing section 28 (FIG. 3). In FIG. 3, in the PDL selection list 38-1, the first priority PDL name "PDL2" and the second priority PDL name "PDL3" are stored. The reading and selecting section 30 reads out the first priority PDL name "PDL2" from the PDL selection list 38-1 and refers to the storing section 29 (FIG. 4) for judging whether or not the PDL process based on the PDL2 is executed and is ended. In FIG. 4, in the storing section 29, because the execution end information corresponding to the PDL name "PDL2" is not stored, so the reading and selecting section 30 judges that the PDL process based on the PDL2 is not ended and selects the first priority PDL "PDL2" as the change PDL.

Further, when the switch source PDL name is "PDL2", and the error name is "resource shortage" that are notified from the continuation judging section 27, the reading and selecting section 30 reads out the PDL selection list 38-5 from the list storing section 28 (FIG. 3). In FIG. 3, in the PDL selection list 38-5, the first priority PDL name "PDL1" and the second priority PDL name "PDL3" are stored. The reading and selecting section 30 firstly refers to the storing section 29 (FIG. 4) for judging whether or not the PDL process based on the first priority PDL "PDL1" is executed and is ended. In FIG. 4, in the storing section 29, because the execution end information corresponding to the PDL name "PDL1" is stored, so the reading and selecting section 30 judges that the PDL process based on the PDL1 is executed and is ended, next judges whether or not the PDL process based on the second priority PDL "PDL3" is executed and is ended. In the storing section 29 (FIG. 4), because the execution end information corresponding to the PDL name "PDL3" is not stored, so the reading and selecting section 30 judges that the PDL process based on the PDL3 is not ended and selects the second priority PDL "PDL3" as the change PDL.

The reading and selecting section 30 notifies the changing section 31 of the PDL name of the change PDL as the change PDL name when performing the selection of the change PDL. Moreover, when the change PDL cannot be selected, the reading and selecting section 30 notifies the controlling section 17 that the change PDL cannot be selected.

The changing section 31 has a function to change each PDL to each other PDL, and reads out the description PDL name and the corresponding PDL data from the temporary storing section 12, when receiving a notification of the change PDL name from the reading and selecting section 30. Further, the changing section 31 changes the PDL data into change PDL data described by the change PDL through using change function from the description PDL into the change PDL. Furthermore, the changing section 31 sends the change PDL name and the change PDL data to the temporary storing section 12 and makes it store them. Moreover, the changing section 31 notifies the controlling section 17 of completion of the change process and the change PDL name.

The panel displaying section 16, as notifying section and displaying section, has a function to display various notification scenes for notifying of the occurrence of error, the switch of the PDL or the like, as shown by FIG. 1, and has an operator panel 32 and a display controlling section 33.

The operator panel 32 displays various notification scenes on the basis of the control of the display controlling section 33.

FIG. 5A is an explanation diagram (I) of notification scene that is displayed on an operator panel of embodiment 1; FIG. 5B is an explanation diagram (II) of notification scene that is displayed on an operator panel of embodiment 1; and FIG. 5C is an explanation diagram (III) of notification scene that is displayed on an operator panel of embodiment 1.

FIG. 5A is a scene in printing for notifying that the printer 10 is in printing. Further, FIG. 5B is a scene in switch printing for notifying that the PDL has been switched and the print process has been continued after error occurred. Moreover, FIG. 5C is a print stoppage scene for notifying that the print process was stopped due to the error after the switching processes to all PDLs were implemented.

The display controlling section 33 performs edit of the notification scene and instructs the operator panel 32 to display the notification scene on the basis of the instruction from the controlling section 17.

For example, when the displaying instruction of the scene in printing is received from the controlling section 17, the panel displaying section 16 makes the operator panel 32 display the scene in printing (FIG. 5A).

Moreover, when received the displaying instruction of the scene in switch printing from the controlling section 17, the display controlling section 33 reads out the description PDL name and the change PDL name from the temporary storing section 12; and edits the scene in switch printing (FIG. 5B) including the description PDL name and the change PDL name; and makes the operator panel 32 display the scene. The scene in switch printing shown by FIG. 5B is formed by the description PDL name "PDL1" and the change PDL name "PDL2".

Moreover, when the error name together with the display instruction of the print stoppage scene are notified from the controlling section 17, the display controlling section 33 reads out the description PDL name from the temporary storing section 12; edits the print stoppage scene (FIG. 5C) including the notified error name and the description PDL name read out; and makes the operator panel 32 display the scene. In the print stoppage scene shown by FIG. 5C, the error name is "memory full" and the PDL name is "PDL1".

The controlling section 17 has a function to control each section of the printer 10. For example, when notified of a receiving of the print job from the interface section 11, the controlling section 17 notifies the PJL processing section 18 of it and makes the language judging section 21 implement an analysis process of the PJL data. Further, when the description PDL name is notified from the PJL processing section 18, the process execution time number i counted in the counter 26 is initialized, and the execution end information that is stored in the storing section 29 is all deleted, so that the storing section 29 is initialized at the same time. Further, the controlling section 17 adds "1" to the process execution time number i of the counter 26, notifies the PDL processing section 19 of the description PDL name and instructs the execution of the PDL process after made the storing section 29 store the execution end information "end" into the execution end information item corresponding to the notified description PDL name.

Moreover, the controlling section 17 reads out the process execution time number i from the counter 26 when notified the completion of the expanding process from the expansion processing section 20. When i=1, the controlling section 17 sends the display instruction of the scene in printing to the panel displaying section 16. When i≠1, namely i=2 or 3, the controlling section 17 sends the display instruction of the scene in switch printing to the panel displaying section 16. Moreover, the controlling section 17 makes the outputting section 14 execute the output process.

Further, the controlling section 17 executes the adding process with respect to the process execution time number I of the counter 26 and the storing process of the execution end information to the execution end information item corresponding to the change PDL name of the storing section 29, when notified of the completion of the change process and the change PDL name from the changing section 31. Then, the controlling section 17 notifies the PDL processing section 19 of the change PDL name and instructs the PDL processing section 19 to perform the execution of the PDL process on the basis of the change PDL.

Furthermore, the controlling section 17, as a stopping section, sends the display instruction of the print stoppage scene onto the panel displaying section 16 and stops the print process when the print stoppage and the error name are notified from the continuation judging section 27.

Next, it is to explain about the operation of the printer 10 of the present embodiment.

Here, it is to explain the case that the printer 10 receives a print job from the personal computer 9, and executes a print process according to a flow chart.

Figure 6:
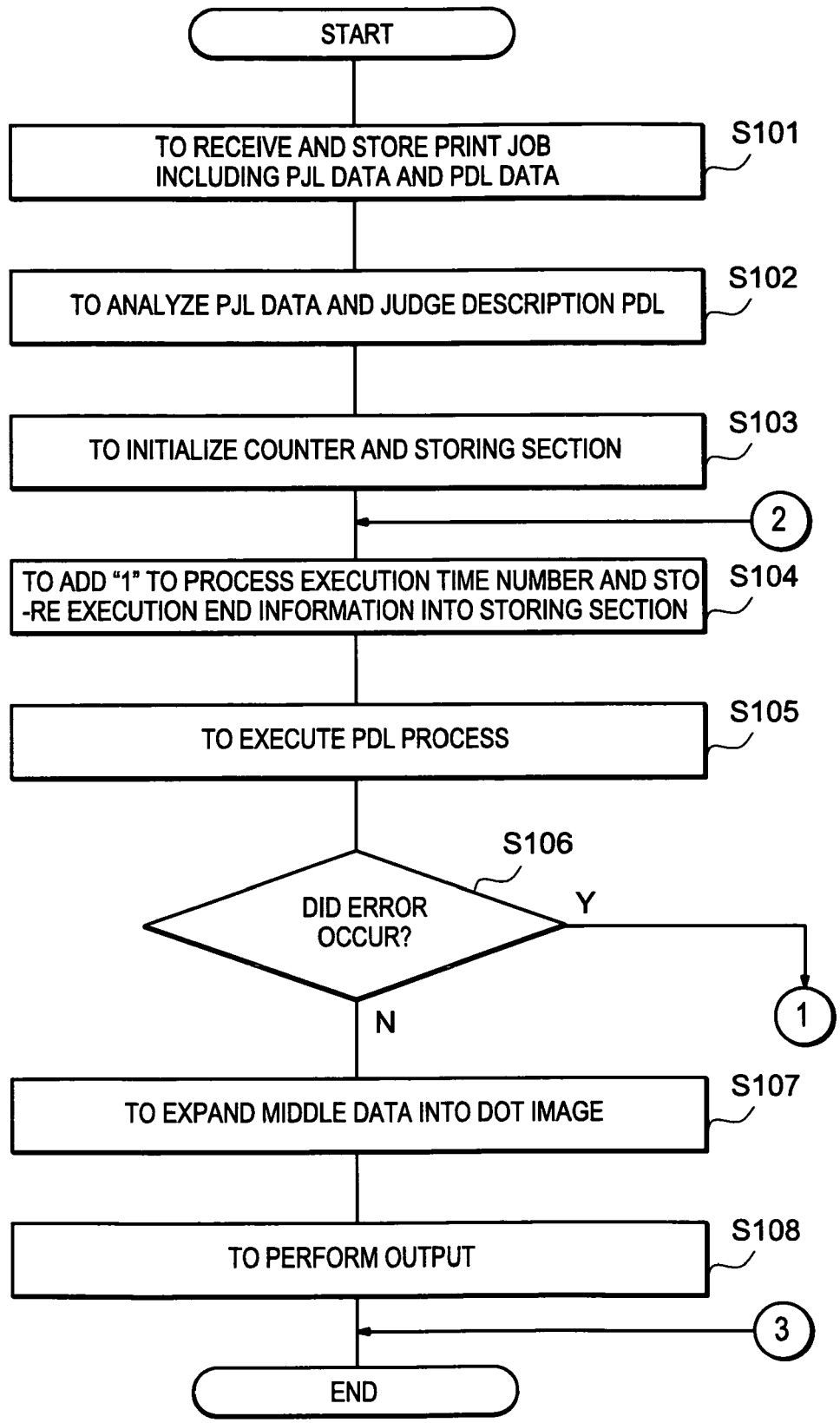
FIG. 6 is a first flow chart for representing a printing operation in embodiment 1 of the present invention.
Figure 7:
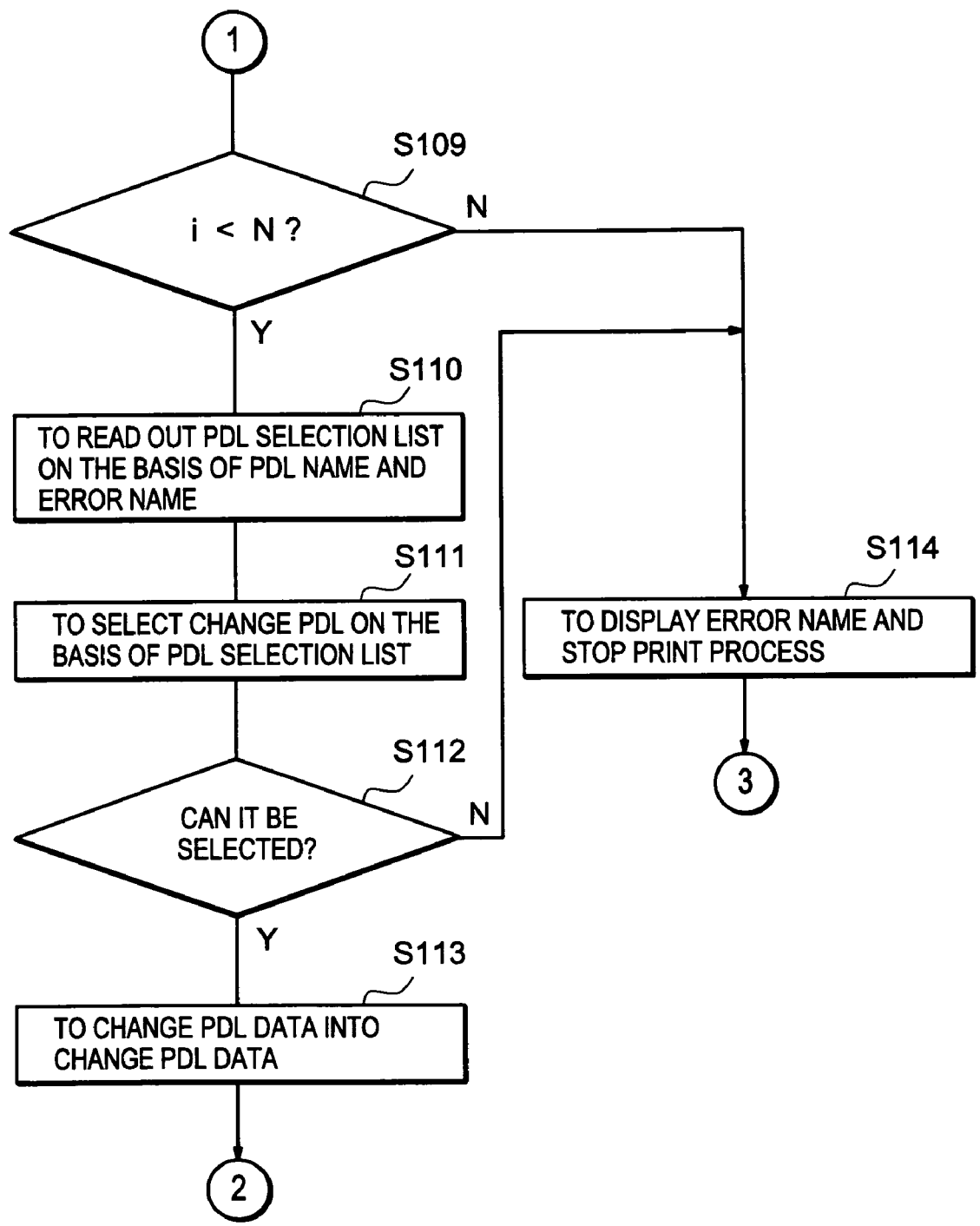
FIG. 7 is a second flow chart for representing a printing operation in embodiment 1 of the present invention.

FIG. 6 is a first flow chart for representing a printing operation in embodiment 1 of the present invention; FIG. 7 is a second flow chart for representing a printing operation in embodiment 1 of the present invention.

Firstly, about the process in which error does not occur till the print process completes, an example is given to explain the occasion of receiving a print job including PDL data described in PDL1 by the printer 10.

In the printer 10, when the interface section 11 receives a print job from the personal computer 9 (Step S101), PJL data included in the print job and PDL data are stored into the temporary storing section 12 (Step S101). The interface section 11 notifies the controlling section 17 of the receiving of the print job.

The controlling section 17 receives the notification from the interface section 11 and instructs the PJL processing section 18 to analyze the PJL data. The PJL processing section 18, when received the instruction, judges that the language judging section 21 has read out the PDL data from the temporary storing section 12; and has implemented an analysis process with respect to the PJL data, and the description PDL is PDL1 (Step S102). The language judging section 21 notifies the controlling section 17 of the judgment result of the description PDL, namely the description PDL name "PDL1".

The controlling section 17 that has received the notification of the description PDL name, firstly, performs initialization of the counter 26 and the storing section 29 (Step S103). A process execution time number i counted in the counter 26 is initialized by "0". Execution end information stored in the storing section 29 is all deleted (Step S103).

Then, the controlling section 17 controls the counter 26 and the storing section 29 to performs an addition process of the process execution time number i and a store process of the execution end information (Step S104). The counter 26 adds "1" to the process execution time number, as "1"; and the storing section 29, as shown by FIG. 4, stores the execution end information "end" into the execution end information item corresponding to the description PDL name "PDL1".

Further, the controlling section 17 notifies the PDL processing section 19 of the description PDL name "PDL1"; and instructs the PDL processing section 19 to execute the PDL process. The PDL processing section 19 reads out the PDL data corresponding to the description PDL name "PDL1" from the temporary storing section 12 on the basis of the instruction; and starts the PDL1 processing section 22 to execute the PDL process (Step S105). The PDL1 processing section 22 interprets the PDL data on the basis of the PDL1, changes the PDL data into middle data and stores the middle data into page buffer. When the PDL process is completed, the PDL processing section 19 notifies the expansion processing section 20 of the completion of the PDL process.

The expansion processing section 20 reads out the middle data from page buffer, performs an expansion process toward a dot image and stores the dot image into a raster buffer, after the completion of the PDL process is notified (Step S107). Further, the expansion processing section 20 notifies the controlling section 17 of the completion of the expansion process.

The controlling section 17, when notified the completion of the PDL process, reads out the process execution time number "i=1" from the counter 26. Further, the controlling section 17 performs the output instruction to the outputting section 14 together with performing a display instruction of a scene in printing onto the panel displaying section 16. The operator panel 32 of the panel displaying section 16 receives the instruction and performs a display of the scene in printing (FIG. 5A) on the basis of the control of the display controlling section 33. Further, the outputting section 14 reads out the dot image from the raster buffer and performs an output based on the dot image (Step S108). By this, the print process in the printer 10 is completed.

As stated above, in the printer 10, the output process is executed after the print job including the PDL data is received; and the PDL process is executed.

Then, about the process in which errors occurs in PDL process execution, an occasion is given as an example to explain that the memory full error occurs in the PDL process execution based on PDL1.

Because steps from that the printer 10 receives the print job (Step S101) to that the PDL process is executed (Step S105) are the same as the case in which error does not occur, the explanation is omitted.

In the execution of PDL process of the PDL1 processing section 22, when error occurs (Step S106), the detecting and judging section 25 in the error processing section 15 detects the occurrence of the error. Then, the detecting and judging section 25 judges the error is which of memory full error, resource shortage error and other error; and judges the PDL in the process execution is which of PDL1, PDL2 and PDL3. The detecting and judging section 25, when judged that the kind of the error is memory full error and the PDL in the process execution is PDL1, notifies the continuation judging section 27 of the detection of the error and the error name "memory full" and the PDL name "PDL1".

The continuation judging section 27, when the notification is received, reads out the process execution time number i from the counter 26 and compares the process execution time number i with an installation PDL number N (Step S109).

When the process execution time number i is under the installation PDL number N, namely i<3 (Step S109), the continuation judging section 27 judges that the print process will continue. Then, the continuation judging section 27 regards the PDL name "PDL1" that has been notified from the detecting and judging section 25 as the switch source PDL name to notify the reading and selecting section 30 of the judgment result, the switch source PDL name "PDL1" and the error name "memory full" that has been notified from the detecting and judging section 25.

The reading and selecting section 30 reads out the corresponding PDL selection list 38-1 from the list storing section 28 on the basis of the switch source PDL name "PDL1" and the error name "memory full" that have been notified (Step S110).

Further, the reading and selecting section 30 performs a selection of the change PDL on the basis of the PDL selection list 38-1 and notifies the changing section 31 of the change PDL name (Step S111). The detailed flow of a selection process of the change PDL in the Step S111 is stated later.

When the change PDL is selected by the reading and selecting section 30 (Step S112), the change process from the PDL data to the change PDL data is implemented by the changing section 31 that has been notified of the change PDL name (Step S113). The changing section 31 reads out the description PDL name and the PDL data from the temporary storing section 12, and changes the PDL data that is described by the description PDL into the change PDL data that is described by the change PDL (Step S113). Further, the changing section 31 notifies the controlling section 17 of the completion of the changing process and the change PDL name together with sending the change PDL name and the change PDL data to the temporary storing section 12 and making them be stored in the temporary storing section 12.

The controlling section 17 receives the notification and performs an addition process for the process execution time number i in the counter 26 and a store process of the execution end information to the storing section 29 (Step S104). The counter 26 adds "1" to the process execution time number I, as "i+1". Further, the storing section 29 stores the execution end information "end" into the execution end information item corresponding to the change PDL name.

Further, the controlling section 17 instructs to execute a PDL process and together with notifying the PDL processing section 19 of the change PDL name. The PDL processing section 19 reads out the change PDL data corresponding to the change PDL name from the temporary storing section 12 on the basis of the instruction and executes the PDL process based on the change PDL (Step S105). Further, the PDL processing section 19 changes the change PDL data into middle data and stores the middle data into the page buffer (Step S105).

When error occurs in the PDL process execution concerning the change PDL data (Step S106), the occurrence of error is detected by the detecting and judging section 25 and the printer 10 repeats the processes below Step S109.

When the PDL process concerning the change PDL data is completed and the completion of the PDL process is notified from the PDL processing section 19, the expansion processing section 20 reads out the middle data from the page buffer, and performs an expansion process toward a dot image and a store process of the dot image to raster buffer (Step S107). Further, the expansion processing section 20 notifies the controlling section 17 of the completion of the expansion process.

Then, the controlling section 17 reads out the process execution time number i from the counter 26. The printer 10 switches the description PDL to the change PDL to continue the print process and the process execution time number i that is counted by the counter 26 is not 1, but is 2 or 3. Therefore, the controlling section 17 sends a display instruction of a scene in switch printing to the panel displaying section 16. Further, the controlling section 17 performs an output instruction to the outputting section 14. When the panel displaying section 16 received the display instruction of the scene in switch printing, the display controlling section 33 reads out the description PDL name and the change PDL name from the temporary storing section 12 and performs an edit of the scene in switch printing, and the operator panel 32 performs a display of the scene in switch printing (FIG. 5B) including the description PDL name and the change PDL name. Moreover, the outputting section 14 reads out the dot image from the raster buffer on the basis of the output instruction and performs an output (Step S108). Then, the print process in the printer 10 is completed.

As stated above, when error occurs in the PDL process execution, after the kind of the error is judged, the PDL of the switch destination corresponding to the kind of the error is selected, and the print process switching to the selected PDL is continued.

Moreover, in the Step S109, when the process execution time number i is equal to the installation PDL number N, namely i=3 (Step S109), the continuation judging section 27 judges that the print process must be stopped, and notifies the controlling section 17 of the judgment result and the error name that has been notified from the detecting and judging section 25.

The controlling section 17 receives the notification and sends a display instruction of a print stoppage scene and the error name to the panel displaying section 16. The panel displaying section 16 uses the display controlling section 33 to performs an edit of the print stoppage scene and uses the operator panel 32 to perform a display of the print stoppage scene (FIG. 5C) including the error name (Step S114). Then, the printer 10 stops the print process by the control of the controlling section 17 (Step S114).

As stated above, after the switch processes toward all PDLs are executed, even if error occurs again, the print process will be stopped.

Moreover, in the Step S111, when the change PDL name cannot be selected (Step S112), the reading and selecting section 30 notifies the controlling section 17 that the change PDL name cannot be selected. The controlling section 17 receives the notification and sends a display instruction of a print stoppage scene and the error name to the panel displaying section 16. Then, the print stoppage scene (FIG. 5C) including the error name is displayed on the operator panel 32 and the printer 10 stops the print process (Step S114).

As stated above, when the change PDL cannot be selected, the print process is stopped.

Then, a flow of a selection process of the change PDL based on the PDL selection list in the Step S111 (FIG. 7) will be explained by using FIG. 8.

Figure 8:
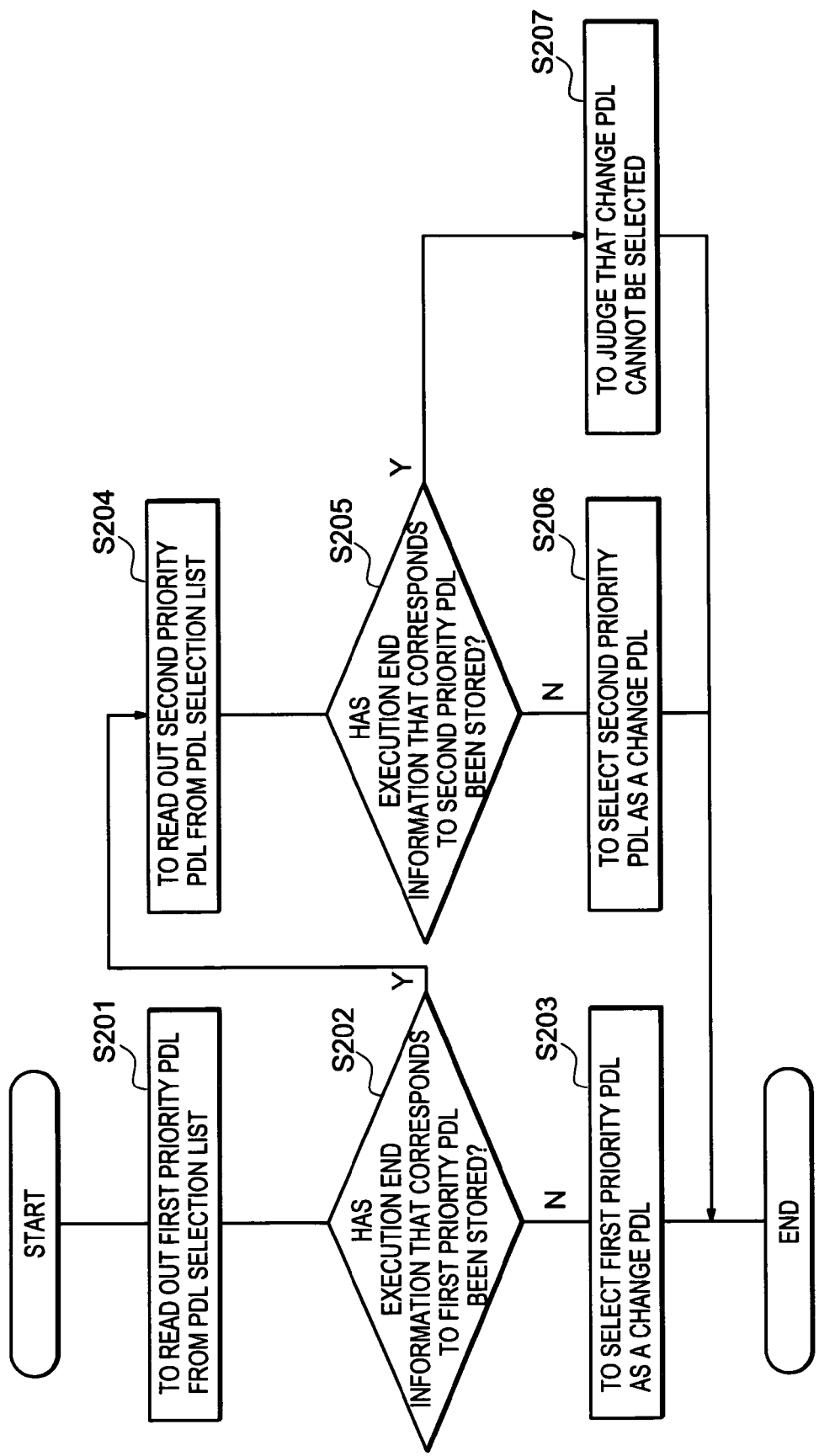
FIG. 8 is a flow chart for representing a PDL selection operation in embodiment 1 of the present invention.

FIG. 8 is a flow chart for representing a PDL selection operation in embodiment 1 of the present invention.

Here, an example is given to perform the explanation of the PDL selection list 38-1 (FIG. 3) corresponding to the switch source PDL name "PDL1" and the error name "memory full".

The reading and selecting section 30, firstly, reads out the first priority PDL name "PDL2" from the PDL selection list 38-1 (Step S201).

Then, the reading and selecting section 30 judges whether or not the execution end information "end" is stored in the execution end information item corresponding to the first priority PDL name "PDL2" by referring to the storing section 29 (Step S202). In the storing section 29 shown by FIG. 4, because the execution end information is not stored in the execution end information item corresponding to the PDL name "PDL2", so the reading and selecting section 30 judges that the PDL process based on the first priority PDL "PDL2" has not been executed (Step S202).

On the basis of the judgment, the reading and selecting section 30 selects the first priority PDL "PDL2" as a change PDL (Step S203). By this, the PDL selection process in the printer 10 is completed.

In the Step S202, when the execution end information "end" is stored in the execution end information item corresponding to the first priority PDL name "PDL2", the reading and selecting section 30 judges that the PDL process based on the first priority PDL "PDL2" is executed and is ended (Step S202).

On the basis of the judgment, the reading and selecting section 30 reads out the second priority PDL name "PDL3" from the PDL selection list 38-2 (Step S204).

Further, the reading and selecting section 30 judges whether or not the execution end information "end" is stored in the execution end information item corresponding to the second priority PDL name "PDL3" by referring to the storing section 29 (Step S205). When the execution end information is stored in the execution end information item corresponding to the PDL name "PDL3", the reading and selecting section 30 judges that the PDL process based on the second priority PDL "PDL3" is not executed (Step S205).

On the basis of the judgment, the reading and selecting section 30 selects the second priority PDL "PDL3" as the change PDL (Step S206). By this, the PDL selection process in the printer 10 is completed.

Further, In the Step S205, when the execution end information "end" is stored in the execution end information item corresponding to the second priority PDL name "PDL3", the reading and selecting section 30 judges that the PDL process based on the second priority PDL "PDL3" is executed and is ended (Step S205). Further, the reading and selecting section 30 judges that the change PDL cannot be selected and notifies the controlling section 17 of the judgment result (Step S206). By this, the PDL selection process in the printer 10 is completed.

As stated above, on the basis of the PDL selection list, according to an order from the first priority PDL, the judgment is implemented to judge whether or not the PDL process is executed and is ended, and the change PDL is selected.

As the above stated, the printer of the present embodiment has a function to switch and change each PDL into other PDL, when errors occurs in the execution of the PDL process concerning the PDL data received from the higher rank apparatus, because other PDL can be selected and the PDL data can be changed to that of the other PDL, so the print process can be continued. At that time because the printer selects the PDL of switch destination according to the kind of the error that has occurred, so it is possible to avoid the occurrence of error, and to execute effectively print process. Moreover, because special printer driver and installation of application in the higher rank apparatus become unnecessary and the existing apparatus can be used, so cost can be reduced. Furthermore, because it is unnecessary to repeat to send the data to the printer from the higher rank apparatus and to perform special operation, the burden to the user can be lightened.

Moreover, in the present embodiment, the switch of the PDL or the notification scene to notify of the print stoppage are displayed on the operator panel 32, however, it is possible to adopt a structure to perform a notification from the printer 10 to the personal computer 9, and to display the notification scene in the personal computer 9.

Embodiment 2

Figure 9:
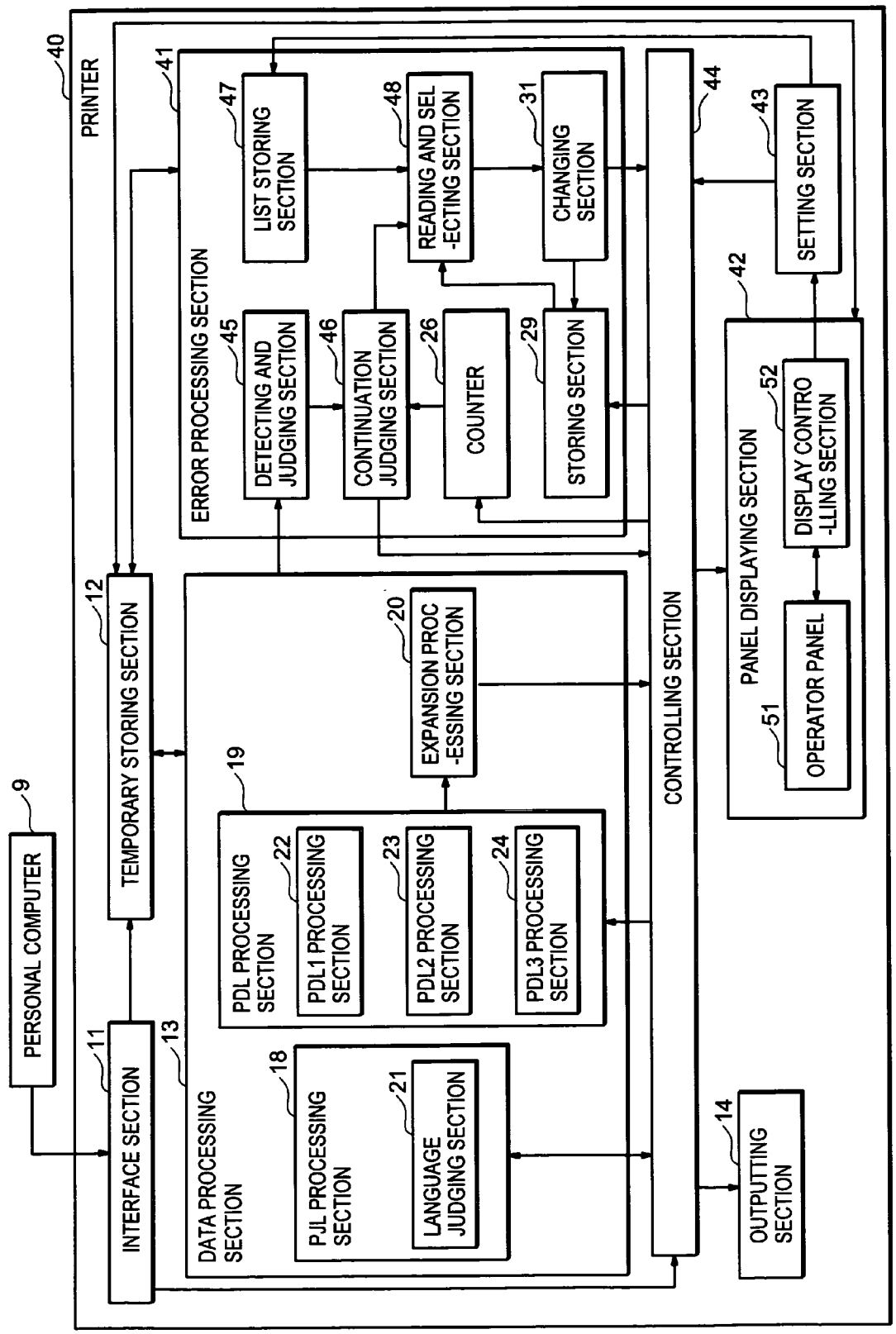
FIG. 9 is a block diagram for representing a structure of a printer in embodiment 2 of the present invention.

FIG. 9 is a block diagram for representing a structure of a printer in embodiment 2 of the present invention.

In a printer 40 of the present embodiment, a setting section 43 is added for performing a setting of the PDL selection lists as compared with the embodiment 1.

Moreover, in the present embodiment, regarding the same composition as the embodiment 1, it is represented with the same symbol, and its explanations is omitted.

The printer 40 of the present embodiment is a printing apparatus in which plural PDLs are installed, as shown by FIG. 9, is connected to a personal computer 9 serving as a higher rank apparatus; and comprises an interface section 11, a temporary storing section 12, a data processing section 13, an outputting section 14, an error processing section 41, a panel displaying section 42, a setting section 43 and a controlling section 44. Moreover, in the printer 40 of the present embodiment, three kinds of PDLs, that is, PDL1, PDL2 and PDL3 are installed.

The error processing section 41, as shown by FIG. 9, includes a detecting and judging section 45, a counter 26, a continuation judging section 46, a list storing section 47, a storing section 29, a reading and selecting section 48 and a changing section 31.

The detecting and judging section 45 monitors operation situation of the data processing section 13 and detects the occurrence of error. Further, the detecting and judging section 45 judges the kind of PDL which is being processed in the PDL processing section 13 when error occurs. Then, the detecting and judging section 45 notifies the continuation judging section 46 of the detection of the error and a PDL name representing the kind of the judged PDL.

The continuation judging section 46 judges whether or not to continue the print process by referring to the counter 26 when the detection of the error and the PDL name are notified from the detecting and judging section 45. The continuation judging section 46, when judged to continue the print process, notifies the reading and selecting section 48 of the PDL name notified from the detecting and judging section 45 as a switch source PDL name. Further, the continuation judging section 46, when judged to stop the print process, notifies the controlling section 44 of the judgment result.

The list storing section 47, as a priority order information storing section, is a storing section that stores PDL selection list as priority order information.

FIG. 10A is a first explanation diagram for representing a structure of list storing section in embodiment 2; and FIG. 10B is a second explanation diagram for representing a structure of list storing section in embodiment 2.

In the list storing section 47 of the present embodiment, as shown by FIG. 10A and FIG. 10B, the PDL selection lists 50-1~3 are being stored corresponding to each of switch source PDL names "PDL1", "PDL2" and "PDL3". Each of PDL selection lists 50-1~3 is inputted via the panel displaying section 42 and is set into the list storing section 47 by the setting section 43.

One the one hand, for example, in the list storing section 47, when error occurred in executing the PDL process based on the PDL1 in the PDL1 processing section 22, the PDL selection list 50-1 which is being stored corresponding to the switch source PDL name "PDL1", is a list that is read out and is used by the reading and selecting section 48. As shown by the FIG. 10A, the PDL selection list 50-1 has a first priority PDL name "PDL2" representing first priority PDL corresponding to priority order "1", and a second priority PDL name "PDL3" representing second priority PDL corresponding to priority order "2".

Further, as shown by the FIG. 10A, in the PDL selection list 50-2 that has been stored corresponding to the switch source PDL name "PDL2", the first priority PDL name "PDL3" is set corresponding to the priority order "1", but the second priority PDL name corresponding to the priority order "2" is set into "inexistence".

Furthermore, as shown by the FIG. 10A, in the PDL selection list 50-3 that has been stored corresponding to the switch source PDL name "PDL3", "inexistence" is respectively set to correspond to the priority orders "1" and "2".

On the other hand, as shown by the FIG. 10A, in the list storing section 47, "inexistence" is set corresponding to the priority order "1" and "2" in any PDL selection lists 50-1~3.

When the switch source PDL name is notified from the continuation judging section 46, the reading and selecting section 48 reads out the corresponding PDL selection list from the list storing section 47 on the basis of the switch source PDL name. Further, the reading and selecting section 48 performs a selection of the change PDL by referring the storing section 29 and notifies the changing section 31 of the selected change PDL name. Furthermore, when performing the selection of the change PDL, in the case that the PDL name read out from the PDL selection list is "inexistence", the reading and selecting section 48 judges that the change PDL cannot be selected and notifies the controlling section 44 of the judgment result.

The panel displaying section 42, as shown by FIG. 9, has an operator panel 51 and a display controlling section 52 and has a function to display various scenes and to input various information.

The operator panel 51 displays various notification scenes for notifying of the occurrence of error, the switch of the PDL or the like on the basis of the control of the display controlling section 52.

FIG. 11 is an explanation diagram of notification scene that is displayed on an operator panel of embodiment 2.

Because a scene in printing and a scene in continuation printing are the same as that in the embodiment 1 (FIG. 5A and FIG. 5B), they are omitted to show. As shown by the FIG. 11, only a display example of a print stoppage scene in the embodiment 2 is shown.

Further, the operator panel 51 displays each menu scene for the setting of the PDL selection list with respect to the list storing section 47 on the basis of the control of the display controlling section 52. Further, the operator panel 51 inputs respective information selected in menu scene and sends it to the display controlling section 52.

Figure 12A:
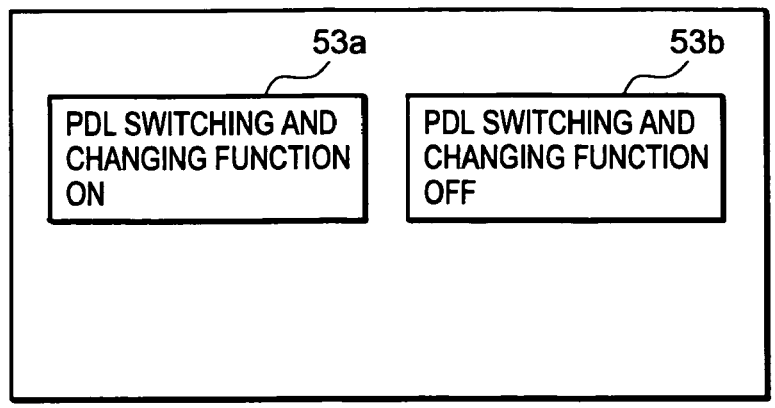
FIG. 12A is a first explanation diagram of menu scene that is displayed on an operator panel of embodiment 2.
Figure 12B:
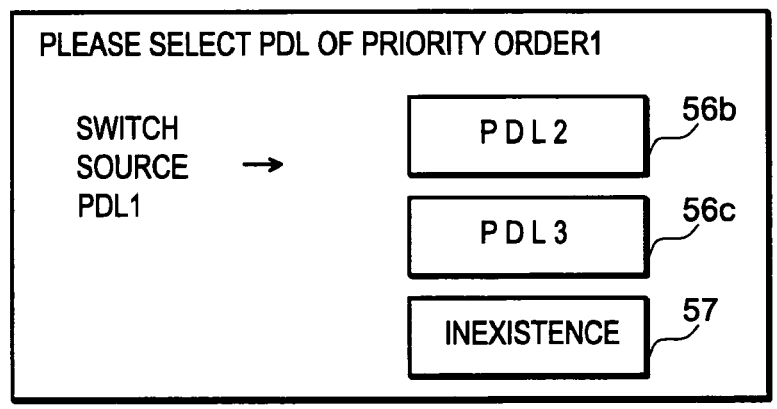
FIG. 12B is a second explanation diagram of menu scene that is displayed on an operator panel of embodiment 2.
Figure 12C:
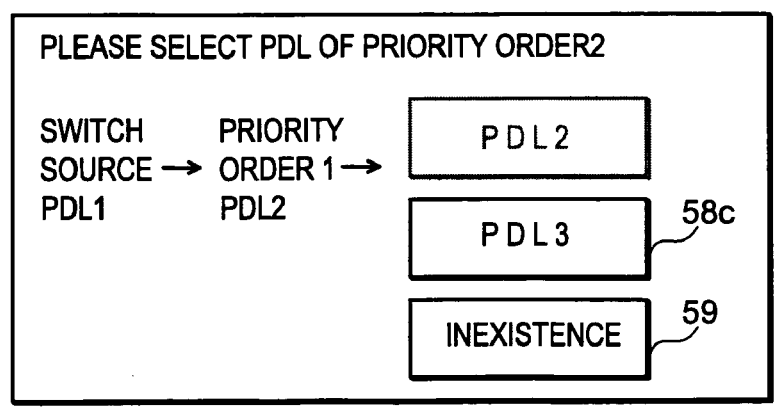
FIG. 12C is a third explanation diagram of menu scene that is displayed on an operator panel of embodiment 2.

Display examples of the menu scene on the operator panel 51 are shown by FIG. 12A, FIG. 12B and FIG. 12C.

FIG. 12A is a first explanation diagram of menu scene that is displayed on an operator panel of embodiment 2; FIG. 12B is a second explanation diagram of menu scene that is displayed on an operator panel of embodiment 2; and FIG. 12C is a third explanation diagram of menu scene that is displayed on an operator panel of embodiment 2.

FIG. 12A is a display example of an on/off setting scene for setting the on/off of a function to change the PDL data by switching the PDL, namely a PDL switching and changing function when error occurs.

The on/off setting scene, as shown by FIG. 12A, has an "on" setting button 53a for performing on-setting of the PDL switching and changing function and an "off" setting button 53b for performing off-setting of the PDL switching and changing function. In the on/off setting scene, when the "on" setting button 53a is pressed, the operator panel 51 inputs on-setting information and send it the display controlling section 52. Further, when the "off" setting button 53b is pressed, the operator panel 51 inputs off-setting information and send it the display controlling section 52.

FIG. 12B is an example of first priority PDL selection scene for selecting first priority PDL concerning the switch source PDL "PDL1".

As shown by the FIG. 12B, on the first priority PDL selection scene, in the PDL selection list 50-1 corresponding to the switch source PDL name "PDL1", a "PDL2" selection button 56b for selecting and setting "PDL2" as the first priority PDL, a "PDL3" selection button 56c for selecting and setting "PDL3" and an "inexistence" selection button 57 for selecting and setting the "inexistence" are displayed. The PDL selection button 56 is general term of the "PDL2" selection button 56b and the "PDL3" selection button 56c. When one of the PDL selection button 56 is pressed, the operator panel 51 inputs the corresponding PDL name, namely one of "PDL2" and "PDL3" as first priority PDL name and sends it to the display controlling section 52. Further, when the "inexistence" selection button 57 is pressed, the operator panel 51 inputs completion selection information representing the completion of the setting and sends it to the display controlling section 52.

FIG. 12C is an example of second priority PDL selection scene that is displayed when the "PDL2" selection button 56b is pressed in the first priority PDL selection scene (FIG. 12B).

As shown by the FIG. 12C, on the second priority PDL selection scene, in the PDL selection list 50-1 corresponding to the switch source PDL name "PDL1", a "PDL3" selection button 58c for selecting and setting "PDL3" as the second priority PDL and an "inexistence" selection button 59 for selecting and setting the "inexistence" are displayed. When the "PDL3" selection button 58c is pressed, the operator panel 51 inputs the corresponding PDL name, namely "PDL3" as second priority PDL name and sends it to the display controlling section 52. Further, when the "inexistence" selection button 59 is pressed, the operator panel 51 inputs completion selection information and sends it to the display controlling section 52.

The display controlling section 52 performs edit processes of each notification scene and each menu scene and instructs the operator panel 51 to display each scene on the basis of the instruction from the controlling section 44. Further, the display controlling section 52 sends the input information to the setting section 43 together with performing display control of the menu scene on the basis of the input information received from the operator panel 51.

The setting section 43 performs setting of each PDL selection list 50-1~3 with respect to the list storing section 47. The setting section 43 sets the PDL selection lists 50-1~3 into the list storing section 47 on the basis of the input information received from the display controlling section 52. Further, the setting section 43 sets the first priority PDL name into "inexistence" and the second priority PDL name into "inexistence" with respect to each of PDL selection lists 50-1~3 for setting the off of the PDL switching and changing function when the off-setting information is received from the display controlling section 52.

The controlling section 44 has a function to control each section of the printer 40.

Next, the operation of the printer 40 of the present embodiment will be explained.

Firstly, it is to explain the flow to set the PDL selection lists 50-1~3 into the list storing section 47 according to a flow chart.

Figure 13:
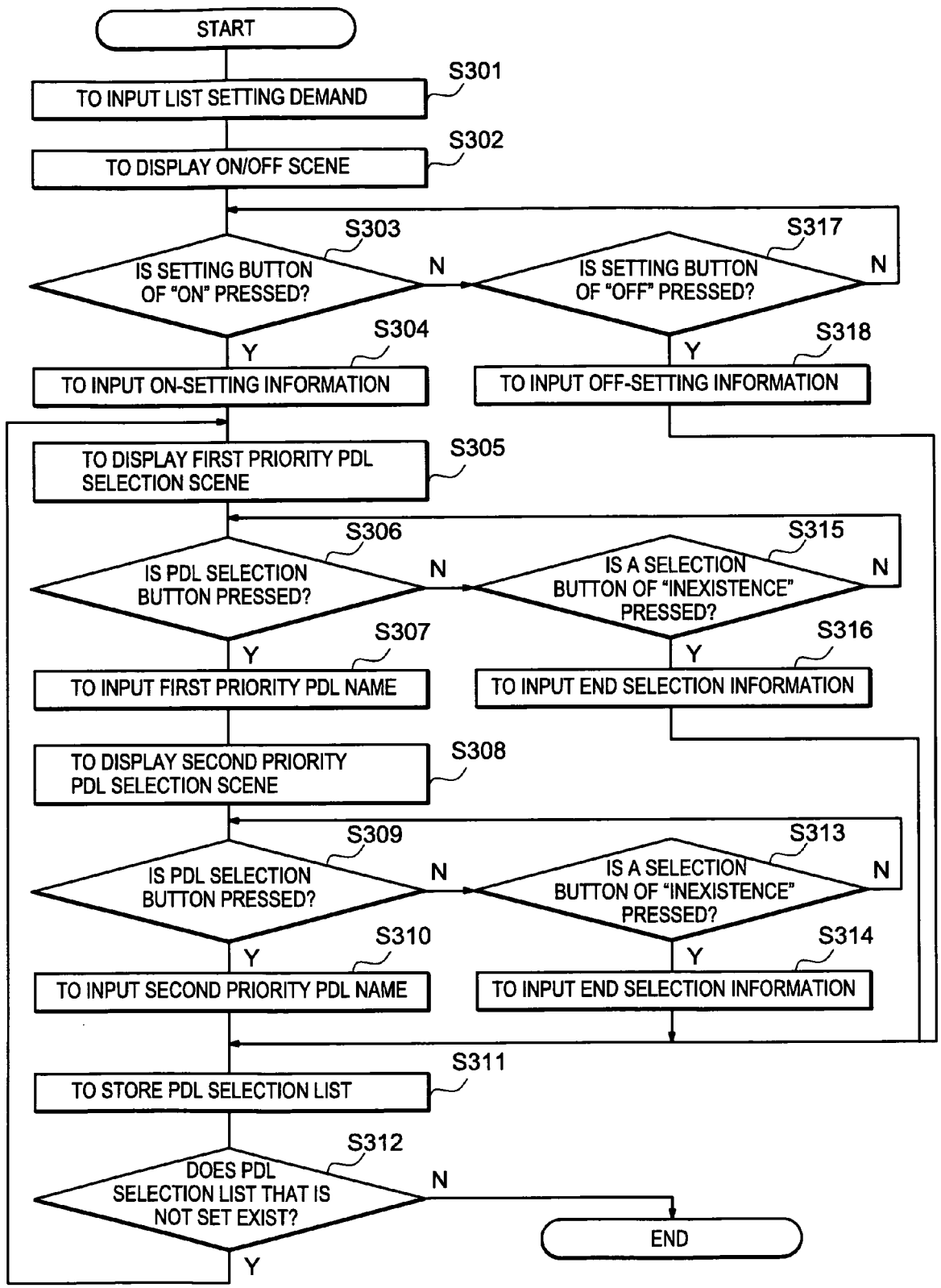
FIG. 13 is a flow chart for representing a list setting operation in embodiment 2 of the present invention.

FIG. 13 is a flow chart for representing a list setting operation in embodiment 2 of the present invention.

Here, it is to explain the case to perform an on-setting of the PDL switching and changing function and to set each of PDL selection lists 50-1~3.

In the printer 40, when setting demand of the PDL switching and changing function is inputted via the operator panel 51 (Step S301), the display controlling section 52 which has received the input, makes the operator panel 51 display on/off setting scene (FIG. 12A) (Step S302).

In the on/off setting scene (FIG. 12A), when the "on" setting button 53a is pressed (Step S303), the operator panel 51 inputs the on-setting information and sends it to the display controlling section 52 (Step S304).

When the on-setting information is inputted, the display controlling section 52, firstly, makes the operator panel 51 display the first priority PDL selection scene (FIG. 10B) corresponding to the switch source PDL "PDL1" (Step S305).

In the first priority PDL selection scene (FIG. 10B), when one of the PDL selection buttons 56 is pressed (Step S306), the operator panel 51 inputs the corresponding PDL name as the first priority PDL name and sends it to the display controlling section 52 (Step S307). For example, when the "PDL2" selection button 56b is pressed (Step S306), the PDL name "PDL2" is inputted as the first priority PDL name (Step S307).

Then, the display controlling section 52 makes the operator panel 51 display the corresponding second priority PDL selection scene (FIG. 12C) on the basis of the inputted first priority PDL name (Step S308). In the second priority PDL selection scene, when the PDL selection button 58 is pressed (Step S309), the operator panel 51 inputs the corresponding PDL name as the second priority PDL name and sends it to the display controlling section 52 (Step S310). For example, when the "PDL3" selection button 58c is pressed (Step S309), the PDL name "PDL3" is inputted as the second priority PDL name (Step S310).

Further, the display controlling section 52 sends the switch source PDL name "PDL1", the first priority PDL name "PDL2" and the second priority PDL name "PDL3" received from the operator panel 51 together with the setting demand of the PDL selection list to the setting section 43. The setting section 43, when received the setting demand, the switch source PDL name, the first priority PDL name and the second priority PDL name, performs the setting of the PDL selection list with respect to the list storing section 47 (Step S311). That is, the setting section 43, as the PDL selection list 50-1 corresponding to the switch source PDL name "PDL1", makes the first priority PDL name "PDL2" and the second priority PDL name "PDL3" store into the list storing section 47 (Step S311). Further, the setting section 43 notifies the controlling section 52 of the setting completion of the PDL selection list 50-1.

Then, the first priority PDL selection scene corresponding to the switch source PDL "PDL2" is displayed on the operator panel 51 by the control of the display controlling section 52 (Step S305), the printer 40 repeats the processes from the Step S305 to the Step S311 for setting the PDL selection list 50-2 corresponding to the switch source PDL "PDL2", the PDL selection list 50-2 corresponding to the switch source PDL "PDL2" is set in the list storing section 47 (Step S311).

Further, the printer 40 repeats the processes from the Step S305 to the Step S311 for setting the PDL selection list 50-3 corresponding to the switch source PDL "PDL3". Furthermore, the PDL selection list 50-3 corresponding to the switch source PDL "PDL3" is set in the list storing section 47 (Step S311).

In the second priority PDL selection scene (FIG. 12C), when the "inexistence" selection button 59 is pressed (Step S313), the operator panel 51 inputs the completion selection information and sends it to the display controlling section 52 (Step S314). After received it, the display controlling section 52 regards the second priority PDL name as "inexistence" and sends it to the setting section 43 together with the setting demand, the switch source PDL name and the first priority PDL name. And, the setting of the corresponding PDL selection list is implemented by the setting section 43 (Step S311). For example, after the first priority PDL name "PDL3" is inputted corresponding to the switch source PDL name "PDL2" (Step S307); and the completion selection information is inputted in the second priority PDL selection scene (Step S313), the display controlling section 52 sends the setting demand, the switch source PDL name "PDL2", the first priority PDL name "PDL3" and the second priority PDL name "inexistence" to the setting section 43. Then, as the PDL selection list 50-2 corresponding to the switch source PDL "PDL2", the first priority PDL name "PDL3" and the second priority PDL name "inexistence" are set in the list storing section 47 by the setting section 43 (Step S311).

Further, in the first priority PDL selection scene (FIG. 12B), when the "inexistence" selection button 57 is pressed (Step S315), the operator panel 51 inputs the completion selection information and sends it to the display controlling section 52 (Step S316). After received it, the display controlling section 52 regards the first priority PDL name and the second priority PDL name as "inexistence" and sends them to the setting section 43 together with the setting demand and the switch source PDL name. And, the setting of the corresponding PDL selection list is implemented by the setting section 43 (Step S311).

For example, the display controlling section 52 sends the setting demand, the switch source PDL name "PDL3", the first priority PDL name "inexistence" and the second priority PDL name "inexistence" to the setting section 43 when the completion selection information is inputted in the first priority PDL selection scene corresponding to the switch source PDL "PDL3" (Step S316). And, as the PDL selection list 50-3 corresponding to the switch source PDL "PDL3", the first priority PDL name "inexistence" and the second priority PDL name "inexistence" are set in the list storing section 47 by the setting section 43 (Step S311).

After the PDL selection list 50-3 corresponding to the switch source PDL "PDL3" is set in the list storing section 47 (Step S311), so that the settings of the PDL selection lists 50-1~3 are completed (Step S312) concerning the three PDL "PDL1", "PDL2" and "PDL3" that are installed in the printer 40, the setting section 43 notifies the controlling section 44 of the setting completion. By this, the list setting process in the printer 40 ends.

As stated above, in the list storing section 47, the PDL selection lists 50-1~3 are set and stored.

Moreover, in the on/off setting scene (FIG. 12A), when the "off" setting button 53b is pressed (Step S317), the operator panel 51 inputs the off-setting information and sends it to the display controlling section 52 (Step S318). The display controlling section 52 transfers the inputted off-setting information to the setting section 43. Then, for setting the off of the PDL switching and selecting function, as shown by FIG. 10B, the setting section 43 sets the first priority PDL name into "inexistence" and the second priority PDL name into "inexistence" concerning each PDL selection list 50-1~3 (Step S311) and notifies the controlling section 44 of the setting completion. By this, the list setting process in the printer 40 ends.

Then, the flow of the print process in the printer 40 of the present embodiment will be explained according to a flow chart.

Figure 14:
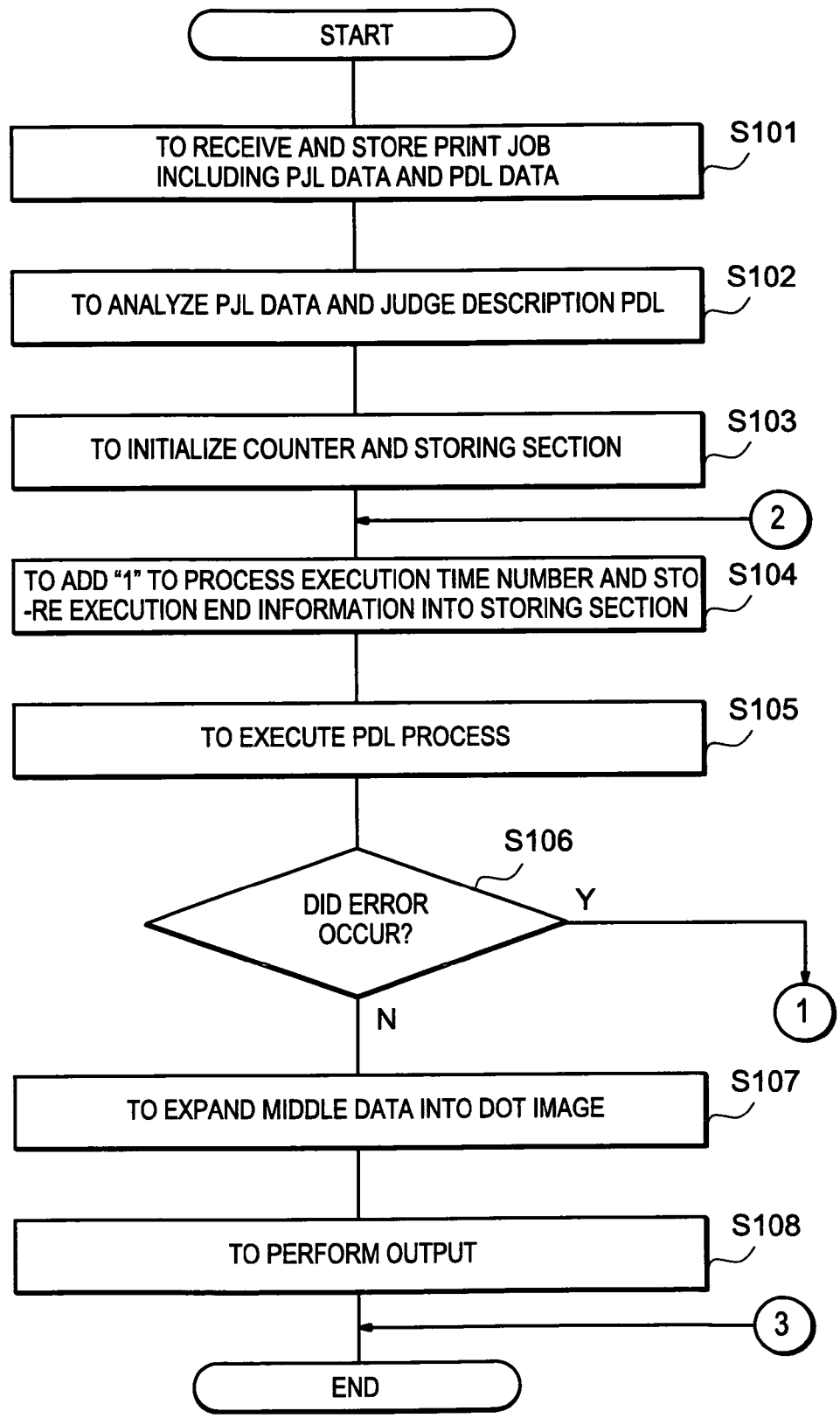
FIG. 14 is a first flow chart representing a print operation in embodiment 2 of the present invention.
Figure 15:
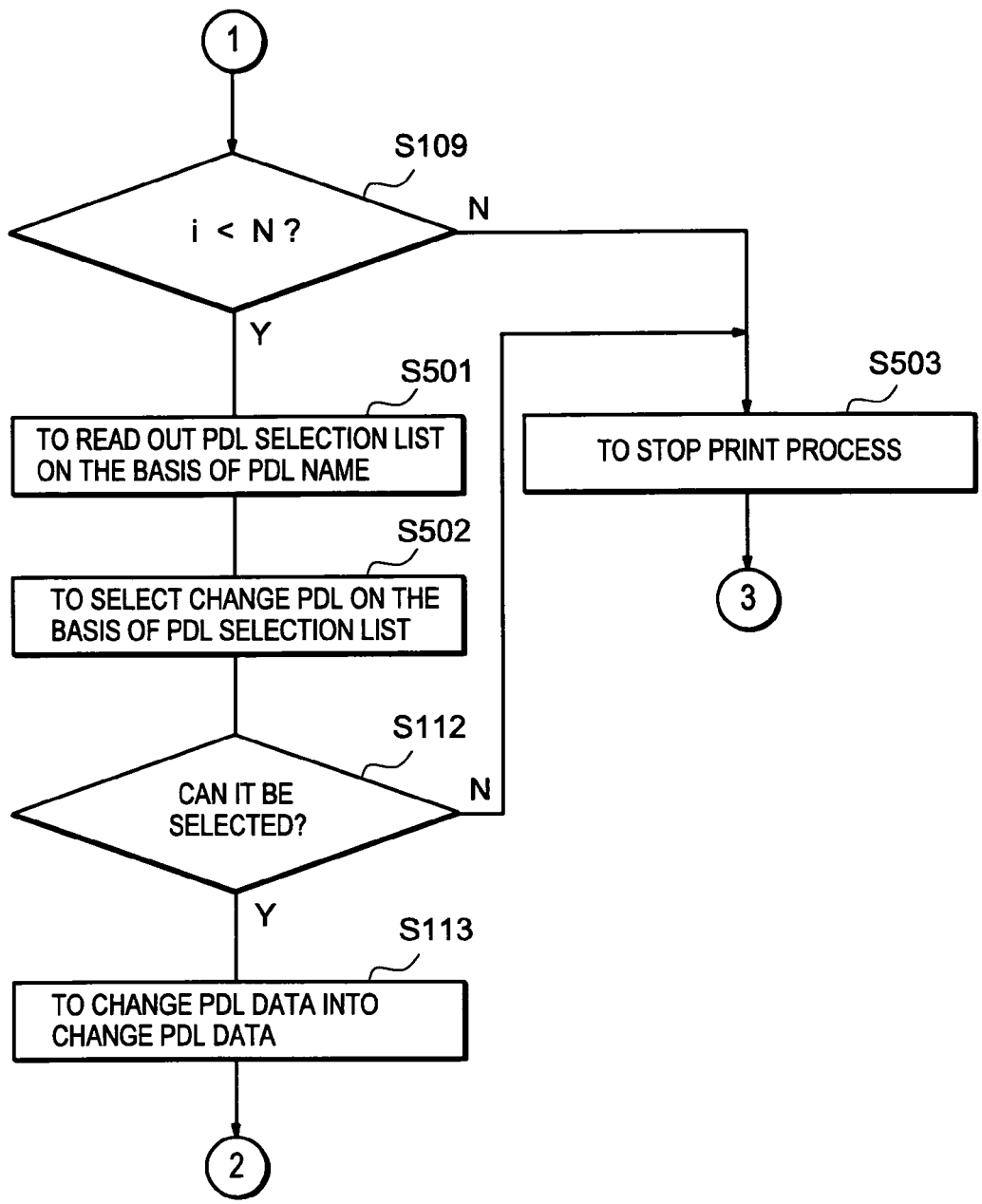
FIG. 15 is a second flow chart representing a print operation in embodiment 2 of the present invention.

FIG. 14 is a first flow chart representing a print operation in embodiment 2 of the present invention; FIG. 15 is a second flow chart representing a print operation in embodiment 2 of the present invention.

Because the flow of the print process when error does not occur is the same as the flow of the embodiment 1 (FIG. 6 and FIG. 7), so the explanation is omitted. Here, it is to explain a flow of a process when error occurs in executing the PDL process in the printer 40.

In the printer 40, when the interface section 11 receives a print job from the personal computer 9, the temporary storing section 12 stores PJL data and PDL data included in the print job (Step S101). The interface section 11 notifies the controlling section 44 of the receiving of the print job.

The controlling section 44 instructs the PJL processing section 18 to analyze the PJL data when notified of the receiving of the print job. Then, the language judging section 21 reads out the PJL data from the temporary storing section 12, executes an analysis process concerning the PJL data and notifies the controlling section 44 of description PDL name (Step S102).

The controlling section 44, firstly, performs initialization of the counter 26 and the storing section 29 before the execution of the PDL process (Step S103). Further, the controlling section 44 performs an addition process of process execution time number i concerning the counter 26 and a store process of execution end information "end" corresponding to the description PDL name concerning the storing section 29 (FIG. 4) (Step S104).

Furthermore, the controlling section 44 notifies the PDL processing section 19 of the description PDL name and the PDL process is executed (Step S105). When error occurs in the PDL process execution (Step S106), in the error processing section 15, the detecting and judging section 45 detects the occurrence of error. Then, the detecting and judging section 45 judges that the PDL in the process execution is which of PDL1, PDL2 and PDL3. Further, the detecting and judging section 45 notifies the continuation judging section 46 of the detection of the error together with the PDL name of the PDL in the process execution.

The continuation judging section 46, when the notification is received, reads out the process execution time number i from the counter 26 and compares the process execution time number i with installation PDL number N (Step S109).

When the process execution time number i is under the installation PDL number N, namely i<3 (Step S109), the continuation judging section 46 judges that the print process will continue. Then, the continuation judging section 46 regards the PDL name that has been notified from the detecting and judging section 45 as the switch source PDL name to notify the reading and selecting section 48 of the judgment result and the switch source PDL name.

The reading and selecting section 48 reads out the corresponding PDL selection list from the list storing section 47 on the basis of the notified switch source PDL name (Step S501).

Further, the reading and selecting section 48 performs a selection of the change PDL on the basis of the PDL selection list and notifies the changing section 31 of the change PDL name (Step S502). The detailed flow of a selection process of the change PDL in the Step S502 is stated later.

When the change PDL is selected by the reading and selecting section 48 (Step S502), the change process from the PDL data to the change PDL data is implemented by the changing section 31 that has been notified of the change PDL name, the change PDL name and the change PDL data are stored into the temporary storing section 12, and the controlling section 44 is notified of the completion of the change process and the change PDL name (Step S113).

The controlling section 44 performs an addition process for the process execution time number i in the counter 26 and a store process of the execution end information "end" to the storing section 29 when the completion of the change process is notified (Step S104).

Further, The controlling section 44 instructs to execute a PDL process together with notifying the PDL processing section 19 of the change PDL name. The PDL processing section 19 reads out the change PDL data from the temporary storing section 12, executes the PDL process based on the change PDL and stores middle data into the page buffer (Step S105).

When error occurs in the PDL process execution concerning the change PDL data (Step S106), the occurrence of error is detected by the detecting and judging section 45, and the printer 40 repeats the processes below the Step S109.

When the PDL process concerning the change PDL data is completed, the expansion processing section 20 performs an expansion process of the middle data which is read out from the page buffer and stores dot image into raster buffer (Step S107). The expansion processing section 20 notifies the controlling section 44 of the completion of the expansion process.

The controlling section 44 reads out the process execution time number i from the counter 26. Because the i that has been read out is not 1, but is 2 or 3, so the controlling section 44 performs a display instruction of the scene in switch printing concerning the panel displaying section 42. Further, the controlling section 44 performs an output instruction to the outputting section 14. After received the instruction, the display controlling section 52 reads out the description PDL name and the change PDL name from the temporary storing section 12 and performs an edit of the scene in switch printing, the operator panel 51 performs a display of the scene in the switch printing (FIG. 5B) including the description PDL name and the change PDL name. The outputting section 14 performs an output on the basis of the dot image read out from the raster buffer (Step S108). By this, the print process in the printer 40 is completed.

As stated above, when error occurs in the PDL process execution, the PDL is switched on the basis of the PDL selection list set previously, so that the print process is continued.

Moreover, in the Step S109, when the process execution time number i is equal to the installation PDL number N, namely i=3 (Step S109), the continuation judging section 46 judges that the print process must be stopped, and notifies the controlling section 44 of the judgment result.

The controlling section 44 receives the notification and performs a display instruction of the print stoppage scene to the panel displaying section 42. Then, the operator panel 51 performs the display of the print stoppage scene (FIG. 11) (Step S503), the printer 40 stops the print process (Step S503).

Moreover, in the Step S502, when the change PDL cannot be selected (Step S112), the reading and selecting section 48 notifies the controlling section 44 that the change PDL cannot be selected. The controlling section 44 receives the notification and sends a display instruction of a print stoppage scene to the panel displaying section 42. Then, the print stoppage scene (FIG. 11) is displayed on the operator panel 51 and the printer 40 stops the print process (Step S503).

As stated above, after all switch processes toward PDL are executed, when error occurs again or when the switch to other PDL cannot be performed, the print process is stopped.

Next, a flow of a selection process of the change PDL based on the PDL selection list in the Step S502 (FIG. 15) will be explained by using FIG. 16.

Figure 16:
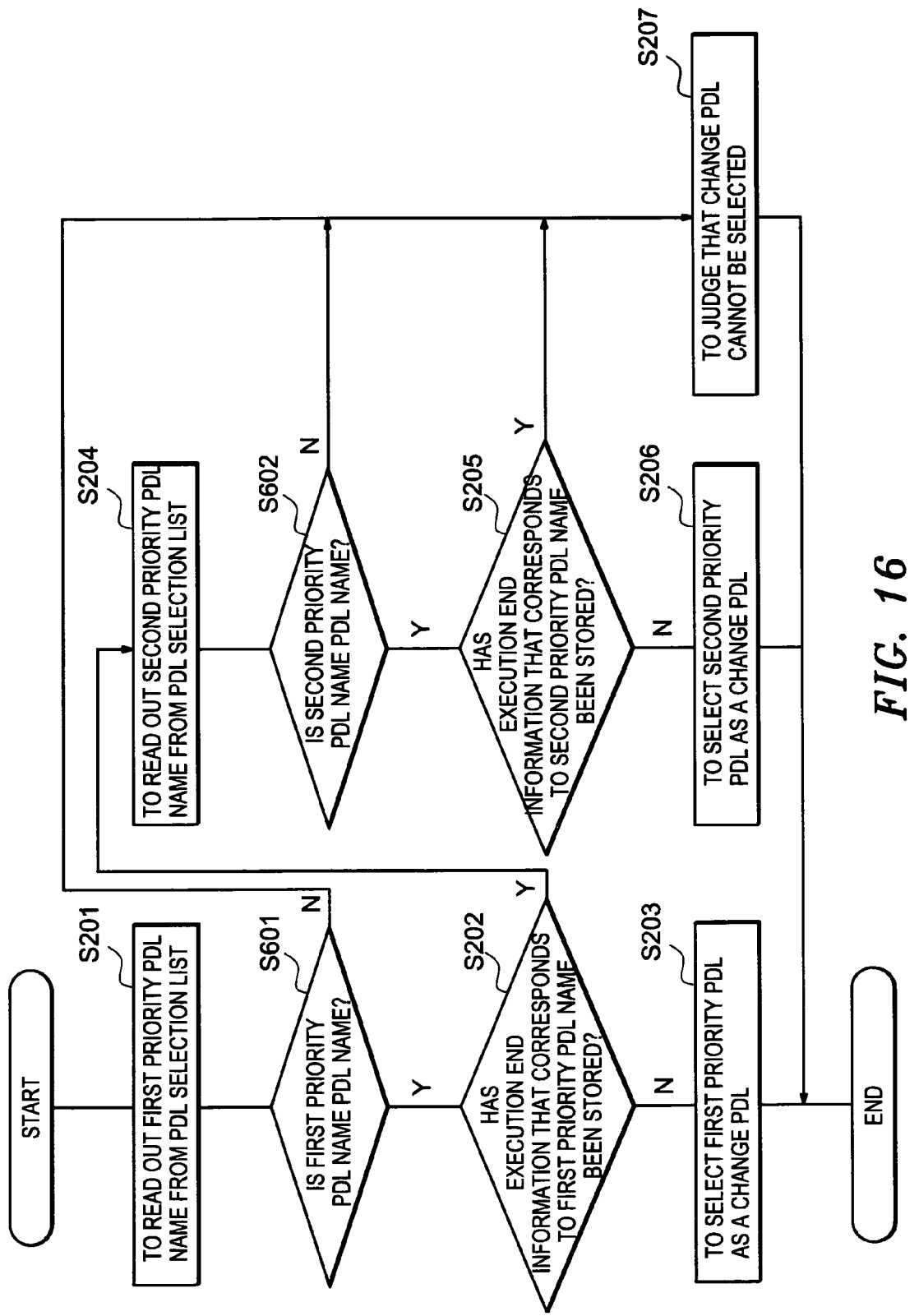
FIG. 16 is a flow chart for representing a PDL selection operation in embodiment 2 of the present invention.

FIG. 16 is a flow chart for representing a PDL selection operation in embodiment 2 of the present invention.

Firstly, an example is given to perform the explanation of the PDL selection list 50-1 corresponding to the switch source PDL name "PDL1".

The reading and selecting section 48 reads out the first priority PDL name from the PDL selection list 50-1 (Step S201) and judges whether or not the first priority PDL name that has been read out is PDL name (Step S601). As shown by the FIG. 10A, in the PDL selection list 50-1 of the list storing section 47, because "PDL2" is set as the first priority PDL name, so the reading and selecting section 48 judges that the first priority PDL name that has been read out is PDL name (Step S601).

Then, the reading and selecting section 48 judges whether or not the execution end information "end" is stored in the execution end information item corresponding to the first priority PDL name "PDL2" by referring to the storing section 29 (FIG. 4) (Step S202). When the execution end information "end" is not stored in the execution end information item corresponding to the first priority PDL name "PDL2", the reading and selecting section 48 judges that the PDL process based on the first priority PDL "PDL2" has not been executed (Step S202).

On the basis of the judgment, the reading and selecting section 48 selects the first priority PDL "PDL2" as a change PDL (Step S203). By this, the PDL selection process in the printer 40 is ended.

In the Step S202, when the execution end information "end" is stored in the execution end information item corresponding to the first priority PDL name "PDL2", the reading and selecting section 48 judges that the PDL process based on the first priority PDL "PDL2" is executed and is ended (Step S202), reads out the second priority PDL name from the PDL selection list 50-1 (Step S204), and judges whether or not the second priority PDL name is PDL name (Step S602). As shown by the FIG. 10A, in the PDL selection list 50-1 of the list storing section 47, because "PDL3" is set as the second priority PDL name, so the reading and selecting section 48 judges that the second priority PDL name is PDL name (Step S602).

Then, the reading and selecting section 48 judges whether or not the execution end information "end" is stored in the execution end information item corresponding to the second priority PDL name "PDL3" by referring to the storing section 29 (Step S205). When the execution end information is not stored, the reading and selecting section 48 judges that the PDL process based on the second priority PDL "PDL3" has not been executed (Step S205), and selects the second priority PDL "PDL3" as a change PDL (Step S206). By this, the PDL selection process in the printer 40 is ended.

In the Step S205, when the execution end information "end" is stored in the execution end information item corresponding to the second priority PDL name "PDL3", the reading and selecting section 48 judges that the PDL process based on the second priority PDL "PDL3" is executed and is ended (Step S205). Further, the reading and selecting section 48 judges that the change PDL cannot be selected and notifies the controlling section 44 of the judgment result (Step S206). By this, the PDL selection process in the printer 40 is ended.

As stated above, on the basis of the PDL selection list, according to an order from the first priority PDL, the judgment is implemented to judge whether or not the PDL process is executed and is ended, and the change PDL is selected.

Next, an example is given to perform the explanation of the PDL selection list 50-3 corresponding to the switch source PDL name "PDL3".

The reading and selecting section 48 performs reading out of the first priority PDL from the PDL selection list 50-3 (Step S201) and judges whether or not the first priority PDL name is PDL name (Step S601). In the list storing section 47, in the PDL selection list 50-2, because "inexistence" is set as the first priority PDL, so the reading and selecting section 48 judges that the first priority PDL name is not PDL name (Step S601). Further, the reading and selecting section 48 judges that the change PDL cannot be selected and notifies the controlling section 44 of it (Step S206). Then, the PDL selection process in the printer 40 is ended.

As stated above, when the "inexistence" is set in the PDL selection list, it is judged that the PDL of the switch destination cannot be selected. Therefore, even if error occurred, the PDL switch and change process is not executed, the print process is stopped.

Moreover, in the Step S602, when judged that the second priority PDL name is not PDL name, the reading and selecting section 48 judges that the change PDL cannot be selected and notifies the controlling section 44 of it (Step S206).

As the above, because the printer of the present embodiment can set the PDL selection list representing of the priority order of switch destination through using the operator panel, it becomes possible to switch the PDL according to user's desire. Further, because it is possible to stop the print process when all PDLs cannot be switched, so useless PDL process can be omitted, and convenience can be further improved.

Moreover, in the present embodiment, when the off-setting information is inputted in the on/off scene (FIG. 12A), the first priority PDL name and the second priority PDL name included in each PDL selection list is set into "inexistence". Thereby, it is possible to adopt a structure to stop operation of error processing section and turn off the PDL switching and changing function when off-setting information is inputted; and to start operation of error processing section and turn on the PDL switching and changing function when on-setting information is inputted. By this, it become unnecessary to repeatedly perform the setting of the PDL selection list per an on-setting, so the burden to the user can be lightened and the shortening of the process in the off-setting can be realized.

Further, in the present embodiment, the setting of the PDL selection list in printer is executed via input using operator panel, it is also possible to input setting information in the higher rank apparatus and send it to the printer.

The present invention is not limited to the foregoing embodiments but many modifications and variations are possible within the spirit and scope of the appended claims of the invention.

What is claimed is:

1. A printing apparatus which receives print data described by one of plural language formats, interprets and outputs the print data, comprising:
   a receiving section that receives the print data and language format information representing language format of the print data;

an interpreting and making section that interprets the print data on the basis of the language format and makes output use data;

a detecting section that detects an occurrence of error in the interpreting and making section;

a priority order information storing section that previously stores priority order information representing an priority order to correspond to the language format information of each language format as other language format;

a reading and selecting section that reads out the corresponding priority order information from the priority order information storing section on the basis of the language format information of the print data, and selects one of the language formats as a change language format on the basis of the priority order information;

a changing section that changes the received print data into change print data described by the selected change language format, and changes the language format information of the print data into change language format information, when the detecting section detected the occurrence of error; and a controlling section that controls the interpreting and making section to execute an interpretation of the change print data and a making of the output use data based on the change language format.

2. The printing apparatus according to claim 1, further comprising:

an error judging section that judges kind of the error detected by the detecting section, wherein the priority order information storing section stores priority order information to further correspond to the kind of each error;

an reading and selecting section further performs to read out priority order information on the basis of the kind of error judged by the error judging section and selects change language format.

3. The printing apparatus according to claim 1, further comprising:

a storing section that stores execution information that corresponds to each language format information, and represents whether or not a process executed by the interpreting and making section on the basis of the language format is ended;

an execution judging section that, when the change language format is selected by the reading and selecting section, refers to the storing section to judge whether or not the process based on the change language format is ended, according to the stored execution information corresponding to language format information of the change language format, wherein when judged that the process is ended, the reading and selecting section that further performs a selection of the change language format on the basis of the priority order information.

4. The printing apparatus according to claim 1, further comprising:

a displaying section that displays for notifying of the change language format when the process based on the change language format is executed by the interpreting and making section.

5. The printing apparatus according to claim 1, further comprising:

a sending section that sends the corresponding language format information to a higher rank apparatus for notifying the change language format when the process based on the change language format is executed by the interpreting and making section.

6. The printing apparatus according to claim 1, further comprising:

an inputting section that inputs respective priority order information to correspond to each language format information; and a setting section that sets the inputted priority order information into the priority order information storing section.

7. The printing apparatus according to claim 1, further comprising:

a counting section that counts process execution time number of the interpreting and making section; and a continuation judging section that judges whether or not to continue print process on the basis of the counted process execution time number when the occurrence of error is detected by the detecting section, wherein when judged to continue, the reading and selecting section performs a selection of the change language format.

8. The printing apparatus according to claim 7, further comprising:

a stopping section that stops the print process, when the continuation judging section judged not to continue; and a notifying section that notifies of a stoppage of the print process.

9. The printing apparatus according to claim 1, wherein the language format is composed of PDL (Page Description Language).

\* \* \* \* \*